United States Patent
Kim et al.

(10) Patent No.: US 10,681,656 B2
(45) Date of Patent: Jun. 9, 2020

(54) METHOD FOR PROCESSING PLURALITY OF SIGNALS IN COMMUNICATION SYSTEM SUPPORTING DIRECT COMMUNICATION BETWEEN TERMINALS AND APPARATUS THEREFOR

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 15/304,802

(22) PCT Filed: May 8, 2015

(86) PCT No.: PCT/KR2015/004617
§ 371 (c)(1),
(2) Date: Oct. 17, 2016

(87) PCT Pub. No.: WO2015/170923
PCT Pub. Date: Nov. 12, 2015

(65) Prior Publication Data
US 2017/0055232 A1   Feb. 23, 2017

Related U.S. Application Data

(60) Provisional application No. 61/990,659, filed on May 8, 2014.

(51) Int. Cl.
*H04J 3/06* (2006.01)
*H04W 56/00* (2009.01)
(Continued)

(52) U.S. Cl.
CPC ....... *H04W 56/001* (2013.01); *H04W 56/002* (2013.01); *H04W 72/12* (2013.01);
(Continued)

(58) Field of Classification Search
CPC ....................................................... H04W 76/10
See application file for complete search history.

(56) References Cited

U.S. PATENT DOCUMENTS 9,532,325 B2 * 12/2016 Chiu .................... H04W 56/002
2013/0148566 A1 * 6/2013 Doppler .............. H04W 72/005
370/312

(Continued)

FOREIGN PATENT DOCUMENTS

KR   1020140009930    1/2014
WO   2013191360       12/2013

OTHER PUBLICATIONS

Korean Intellectual Property Office Application No. 10-2016-7028820, Notice of Allowance dated Nov. 21, 2017, 3 pages.

(Continued)

*Primary Examiner* — Guang W Li
(74) *Attorney, Agent, or Firm* — Lee, Hong, Degerman, Kang & Waimey

(57) ABSTRACT

The present document relates to a method for processing a signal when a plurality of signals are to be received or transmitted in a specific time interval (e.g., a sub-frame) in a wireless communication system supporting direct communication between terminals, i.e., D2D communication, and an apparatus therefor. To this end, when a terminal is to receive a plurality of signals including a discovery signal, a D2D synchronization signal, a resource allocation signal, and a D2D communication signal at a specific time point, the corresponding terminal may preferentially select and process a specific signal from among the plurality of signals.

4 Claims, 22 Drawing Sheets

(51) Int. Cl.
  *H04W 76/10* (2018.01)
  *H04W 76/27* (2018.01)
  *H04W 76/14* (2018.01)
  *H04W 72/12* (2009.01)
  *H04W 8/00* (2009.01)

(52) U.S. Cl.
  CPC ........... *H04W 76/10* (2018.02); *H04W 76/14* (2018.02); *H04W 76/27* (2018.02); *H04W 8/005* (2013.01); *H04W 56/0045* (2013.01)

(56) References Cited

U.S. PATENT DOCUMENTS

| | | | | |
|---|---|---|---|---|
| 2013/0324114 | A1* | 12/2013 | Raghothaman | H04W 8/005 455/426.1 |
| 2014/0056220 | A1* | 2/2014 | Poitau | H04W 76/14 370/328 |
| 2014/0112194 | A1* | 4/2014 | Novlan | H04W 8/005 370/254 |
| 2014/0220936 | A1* | 8/2014 | Turtinen | H04W 76/14 455/411 |
| 2014/0328329 | A1* | 11/2014 | Novlan | H04W 72/042 370/336 |
| 2014/0355597 | A1* | 12/2014 | Yeh, II | H04W 56/0045 370/350 |
| 2015/0098422 | A1* | 4/2015 | Sartori | H04W 72/1242 370/329 |
| 2015/0215903 | A1* | 7/2015 | Zhao | H04W 72/04 370/329 |
| 2015/0271846 | A1* | 9/2015 | Kowalski | H04W 72/14 370/329 |
| 2015/0327118 | A1* | 11/2015 | Yoon | H04W 28/0289 370/328 |
| 2015/0327315 | A1* | 11/2015 | Xue | H04L 5/0044 370/330 |
| 2016/0044619 | A1* | 2/2016 | Ryu | H04W 76/14 370/350 |
| 2016/0095074 | A1* | 3/2016 | Park | H04W 8/005 370/350 |
| 2016/0095133 | A1* | 3/2016 | Hwang | H04L 1/00 370/329 |
| 2016/0112858 | A1* | 4/2016 | Nguyen | H04W 8/005 370/329 |
| 2016/0142898 | A1* | 5/2016 | Poitau | H04W 76/14 370/329 |
| 2016/0198507 | A1* | 7/2016 | Wu | H04W 76/14 370/330 |
| 2016/0227586 | A1* | 8/2016 | Chen | H04W 74/08 |
| 2017/0055232 | A1* | 2/2017 | Kim | H04W 76/14 |
| 2017/0150480 | A1* | 5/2017 | Kim | H04W 72/02 |
| 2017/0230928 | A1* | 8/2017 | Basu Mallick | H04W 56/0045 |

OTHER PUBLICATIONS

European Patent Office Application Serial No. 15789411.4, Search Report dated Nov. 27, 2017, 14 pages.
Sony, "D2D Resource Pool and Scheduling Assignments", 3GPP TSG RAN WG1 Meeting #76bis, R1-141571, XP050787238, Apr. 2014, 5 pages.
Ericsson, "Physical Channels design for D2D", 3GPP TSG RAN WG1 Meeting #75, R1-135806, XP050751250, Nov. 2013, 7 pages.
Intel, "On Resource Allocation and System Operation for D2D Discovery", 3GPP TSG RAN WG1 Meeting #74bis, R1-134141, XP050717331, Oct. 2013, 10 pages.
Ericsson, "Timing Aspects in D2D Discovery and Communication", 3GPP TSG RAN WG1 Meeting #76bis, R1-141392, XP050787062, Apr. 2014, 4 pages.
PCT International Application No. PCT/KR2015/004617, Written Opinion of the International Searching Authority dated Aug. 25, 2015, 18 pages.
Ericsson, "On Scheduling Assignments and Receiver Behaviour", R1-141391, 3GPP TSG-RAN WG1 #76bis, Mar. 21, 2014, 6 pages.
ZTE, "Scheduling-based D2D Communication Resource Allocation", R1-141427, 3GPP TSG-RAN WG1 #76bis, Mar. 22, 2014, 4 pages.
LG Electronics, "Discussion on resource allocation for D2D synchronization", R1-141356, 3GPP TSG RAN WG1 Meeting #76bis, Mar. 22, 2014, 4 pages.
Ericsson, "Frame Structure for D2D-Enabled LTE Carriers," 3GPP TSG-RAN WG1 #76bis, R1-141387, Apr. 2014, 8 pages.
European Patent Office Application Serial No. 18214116.8, Search Report dated Jul. 10, 2019, 8 pages.

* cited by examiner

METHOD FOR PROCESSING PLURALITY OF SIGNALS IN COMMUNICATION SYSTEM SUPPORTING DIRECT COMMUNICATION BETWEEN TERMINALS AND APPARATUS THEREFOR

CROSS-REFERENCE TO RELATED APPLICATIONS

This application is the National Stage filing under 35 U.S.C. 371 of International Application No. PCT/KR2015/004617, filed on May 8, 2015, which claims the benefit of U.S. Provisional Application No. 61/990,659, filed on May 8, 2014, the contents of which are all hereby incorporated by reference herein in their entirety.

TECHNICAL FIELD

Following description relates to a method of processing a signal when a plurality of signals are received or transmitted in a specific time interval in a wireless communication system supporting direct communication between terminals, i.e., D2D communication, and an apparatus therefor.

BACKGROUND ART

FIG. 1 is a diagram for explaining a concept of direct communication between terminals to which the present invention is applicable.

A general communication scheme is served by an eNB for a plurality of user equipments (UEs). On the contrary, according to a D2D communication scheme, as shown in FIG. 1, if a resource for D2D communication is allocated, direct communication can be performed between a UE 1 and a UE 2.

When a UE performs communication with a different UE using a direct radio channel, it may be able to use a discovery signal as a method of discovering a counterpart UE of the communication. In this case, although the UE corresponds to a terminal of a user, if such a network device as an eNB transmits and receives a signal according to a communication scheme between UEs, the network device can also regarded as a sort of UEs.

In the following, a directly connected link between UEs is referred to as a D2D link and a link used for a UE to perform communication with an eNB is referred to as an eNB-UE link.

DISCLOSURE OF THE INVENTION

Technical Problem

For D2D communication, as mentioned in the foregoing description, various signals including not only a discovery signal for discovering a UE to perform the D2D communication but also a synchronization signal for matching synchronization between UEs, a resource allocation (SA) signal for allocating a D2D resource, and the like. If it is necessary for a UE to receive a plurality of D2D signals or transmit a plurality of signals at specific timing, signal transmission and reception of the UE may become complicated.

The present invention intends to provide a method of processing a plurality of signals and an apparatus therefor to solve the aforementioned problem.

Technical Solution

To achieve these and other advantages and in accordance with the purpose of the present invention, as embodied and broadly described, according to one embodiment, a method of transmitting and receiving a signal, which is transmitted and received by a first user equipment (UE) in a wireless communication system supporting D2D (device-to-device) communication, includes the steps of receiving an RRC (radio resource control) signal related to D2D communication from an eNB, receiving a discovery signal from one or more UEs among a plurality of UEs located within a prescribed range, transceiving a D2D synchronization signal for D2D communication with a specific UE among UEs which have transmitted the discovery signal, transceiving a resource allocation (SA (scheduling assignment)) signal with a specific UE among the UEs which have transmitted the discovery signal, and transmitting and receiving a D2D communication signal based on the resource allocation signal. In this case, if a plurality of signals including at least one selected from the group consisting of the discovery signal, the D2D synchronization signal, the resource allocation signal, and the D2D communication signal are received in an identical time section, a specific signal among a plurality of the signals is preferentially selected and processed.

In this case, if a plurality of the signals are received in the identical time section, a signal received from a UE of a small TA (timing advanced) can be preferentially processed among a plurality of the signals.

And, if a plurality of the signals are received in the identical time section, the D2D synchronization signal can be preferentially processed among a plurality of the signals. In this case, if a TA value of the D2D synchronization signal among a plurality of the signals is greater than a TA value of a signal rather than the D2D synchronization signal among a plurality of the signals, the D2D synchronization signal can be preferentially processed.

If a signal using a normal CP (cyclic prefix) and a signal using an extended CP are included in a plurality of the signals, the signal using the extended CP can be preferentially processed.

If a first RPT (resource pattern of transmission), which is allocated to transmit a first D2D communication signal to a second UE among a plurality of the UEs by a first UE, and a second RPT, which is allocated to transmit a second D2D communication signal to a third UE among a plurality of the UEs by the first UE, comprise overlapped transmission timing, the first UE selects and transmit one of the first D2D communication signal and the second D2D communication signal at the overlapped transmission timing.

In this case, if the first RPT is dynamically assigned and the second RPT is semi-statically assigned, the first D2D communication signal can be preferentially transmitted.

And, a D2D communication signal of an RPT of which transmission is started first can be preferentially transmitted among the first RPT and the second RPT.

The first RPT and the second RPT are indicated by a predetermined index and a D2D communication signal of an RPT corresponding to a lower index can be preferentially transmitted among the first RPT and the second RPT.

A D2D communication signal not selected from among the first D2D communication signal and the second D2D communication signal can be dropped or delayed at the overlapped transmission timing. In this case, the delayed D2D communication signal is transmitted using a transmission parameter to be used at the overlapped transmission timing at following transmission timing and the dropped D2D communication signal can be transmitted using a new transmission parameter at following transmission timing.

One of the first RPT and the second RPT corresponds to a first type RPT transmitted by highest priority and the first D2D communication signal can be selected and transmitted at the overlapped transmission timing. In this case, the first type RPT can be assigned for an emergency signal.

To further achieve these and other advantages and in accordance with the purpose of the present invention, according to a different embodiment, a user equipment (UE) operating as a first user equipment in a wireless communication system supporting D2D (device-to-device) communication can include a transceiver configured to receive an RRC (radio resource control) signal related to D2D communication from an eNB, the transceiver configured to receive a discovery signal from one or more UEs among a plurality of UEs located within a prescribed range, the transceiver configured to transceive a D2D synchronization signal for D2D communication with a specific UE among UEs which have transmitted the discovery signal, the transceiver configured to transceive a resource allocation (SA (scheduling assignment)) signal with a specific UE among the UEs which have transmitted the discovery signal, the transceiver configured to transmit and receive a D2D communication signal based on the resource allocation signal, and a processor configured to control an operation of the transceiver in a manner of being connected with the transceiver. In this case, if a plurality of signals including at least one selected from the group consisting of the discovery signal, the D2D synchronization signal, the resource allocation signal, and the D2D communication signal are received in an identical time section, the processor is configured to preferentially select and process a specific signal among a plurality of the signals.

In this case, if a resource is allocated to transmit a plurality of transmission signals at specific transmission timing, the processor is configured to select and transmit a specific signal from among a plurality of the transmission signals.

Advantageous Effects

According to the present invention, it is able to enhance D2D communication performance by lowering transmission and reception complexity of a UE and clarifying priority among a plurality of signals.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As mentioned in the foregoing description, following description relates to a method of processing a signal when a plurality of signals are received or transmitted in a specific time interval in a wireless communication system supporting D2D communication, and an apparatus therefor. To this end, first of all, a system supporting D2D to which the present invention is applied is explained in detail.

<Operation According to TA Value in D2D Communication>

Figure 1:
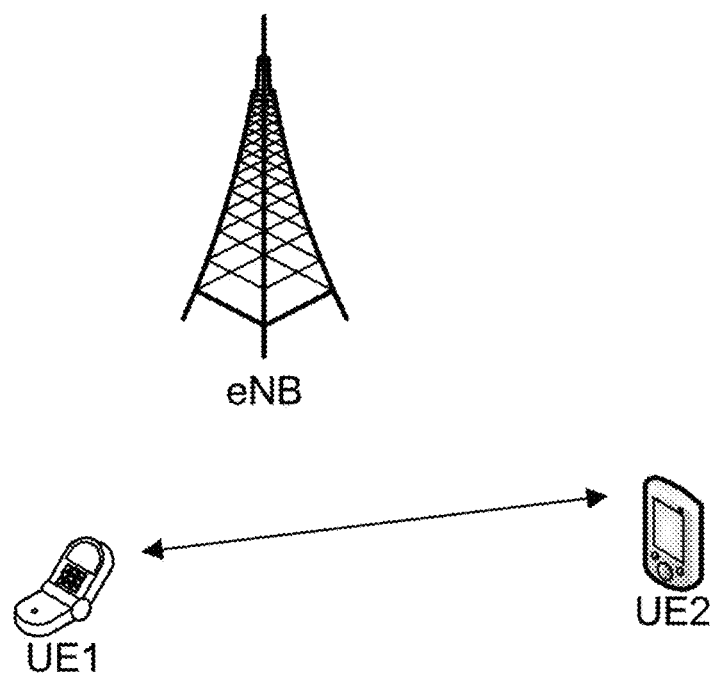
FIG. 1 is a diagram for explaining a concept of direct communication between UEs to which the preset invention is applicable.

As shown in FIG. 1, a UE operates a D2D link and performs communication with a UE located at a position incapable of being connected by the D2D link at the same time. In this case, the communication is performed through an eNB-UE link. In particular, it is preferable to manage a wireless communication system in which the D2D link and the eNB-UE link coexist in terms of a specific UE.

In general, resources used by a wireless communication system can be classified into a DL resource used by an eNB to perform transmission to a UE and a UL resource used by the UE to perform transmission to the eNB. In a FDD system, the DL resource and the UL resource correspond to a DL band and a UL band, respectively. In a TDD system, the DL resource and the UL resource correspond to a DL subframe and a UL subframe, respectively. In general, since the DL resource corresponds to a resource in which the eNB transmits a signal with high transmit power, an interference level of the DL resource is too high for a UE managing a D2D link with relatively low power. Hence, it may be preferable to utilize the UL resource for the D2D link.

A UL resource includes a plurality of UL subframes. In case of a UE synchronized with an eNB in a manner of being connected with the eNB, the UE is able to identify a UL subframe boundary based on a timing advance (TA) indication indicated by the eNB.

Figure 2:
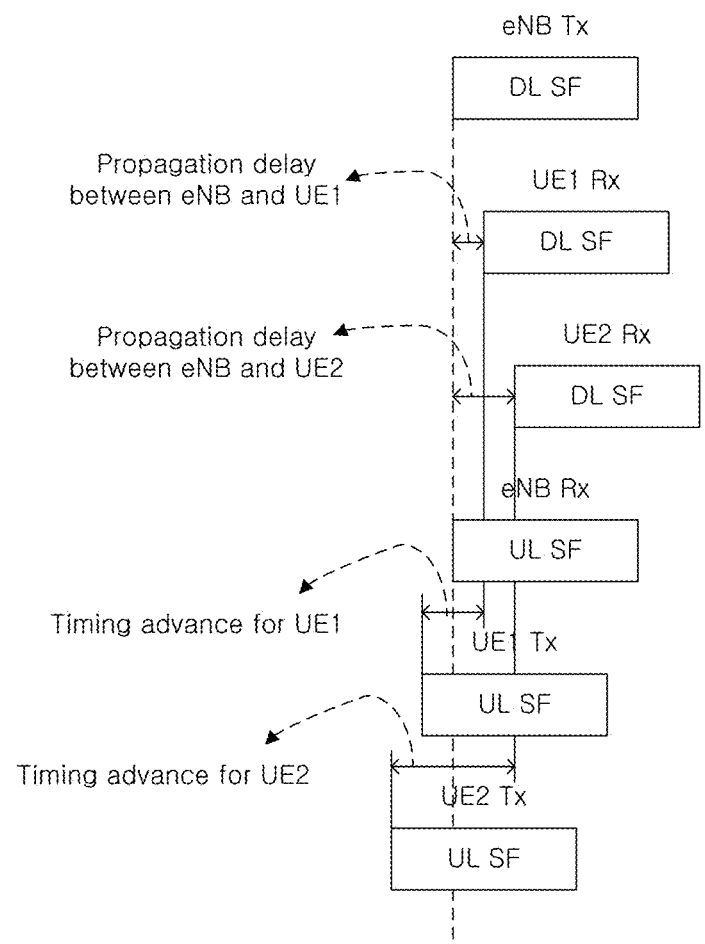
FIG. 2 is a diagram for an example of identifying a UL subframe boundary via TA indication.

FIG. 2 is a diagram for an example of identifying a UL subframe boundary via TA indication.

An eNB indicates each UE to set a UL subframe boundary earlier as much as prescribed time via a TA indication from a timing at which a DL subframe boundary is detected to make signals transmitted by a plurality of UEs of a different distance arrive at an identical timing. If an appropriate TA is set, in particular, as shown in FIG. 2, if a timing advance value is set by doubling propagation delay between a UE and an eNB, since it is able to compensate for the loss due to the propagation delay between the eNB and each UE, it is able to make signals transmitted by UEs of a different position arrive at the eNB at the same time.

Each UE can obtain a UL subframe boundary of the eNB-UE link via the aforementioned TA indication. And, since it is highly probable that UEs, which are adjacent to each other and mainly performing a D2D operation, have a similar TA value, it is able to determine a subframe boundary of a D2D link based on the TA value when synchronization is performed between the UEs. In particular, when the D2D link uses a UL resource, since a subframe boundary used by the D2D link and a subframe boundary used by the eNB-UE link are identical to each other, it is able to smoothly perform an operation of switching the two links in time dimension, i.e., it is able to smoothly operate the D2D link in a specific subframe and operate the eNB-UE link in a different subframe.

Meanwhile, in some cases, it may also be necessary for a UE not connected to the eNB to perform a D2D operation. In this case, since the UE not connected to the eNB is unable to receive a TA indication from the eNB, it is difficult for the UE to have a clear reference for setting a subframe boundary for a D2D link. Of course, although the UE not connected to the eNB is able to attempt to connect to the eNB via such a process as a random access before a D2D operation is performed and set a subframe boundary based on an obtained TA indication, if the UE attempts to connect to the eNB whenever the UE performs D2D communication, it may bring about additional time delay and battery consumption. Hence, it is preferable to design an operation of the UE not connected to the eNB to be performed without a TA indication.

In this case, an operation without a TA indication may mean that there is no TA value specialized for a specific UE. This can be comprehended as pluralities of unspecified UEs operate with an identical TA value. Specifically, it may indicate that a DL subframe boundary received by a UE becomes a boundary of a UL subframe (or a D2D subframe) by setting a TA value to 0, or the DL subframe boundary is configured by a specific TA value which is determined in advance via system information and the like.

D2D communication can be mainly classified into a discovery process for identifying whether or not a target UE of the D2D communication exists near a UE and a communication process for transceiving data with a specific UE. When D2D communication is performed without a TA indication, the two processes can be applied to the D2D communication. Or, one of the two processes can be applied to the D2D communication only.

As an example, a UE not connected to an eNB performs the discovery process without a TA indication. Yet, if a UE intending to perform communication via the discovery process is discovered, the UE may attempt to connect to the eNB and perform the communication process according to an obtained TA indication. In this case, when a UE connected to the eNB performs a specific process or all processes of the D2D communication to match synchronization with the UE not connected to the eNB, the UE connected to the eNB may operate under an assumption that there is no TA indication obtained in advance. In particular, if the UE connected to the eNB performs D2D communication according to a TA indication, since synchronization of a UL subframe is identically maintained in the D2D communication and the eNB-UE link, an impact on the eNB-UE link caused by the D2D communication can be minimized. In particular, if a specific subframe is used for the D2D communication, a subframe adjacent to the specific subframe that maintains an identical subframe boundary can be utilized as the eNB-UE link. As a result, in the aspect of at least a D2D signal transmitting UE, which does not require transmission/reception operation switching between the eNB link and the D2D link, the UE is able to transmit a D2D signal in all resources in a subframe allocated by D2D in D2D communication, which is performed according to a TA indication.

When the discovery process is performed without a TA indication and the communication process is performed according to a TA indication, if a UE not connected to an eNB is able to identify a fact that a counterpart UE of D2D communication is not connected to the eNB as well, similar to the discovery process, the UE not connected to the eNB can immediately attempt to perform the D2D communication without a TA indication instead of passing through the communication process, which is performed according to subframe synchronization based on a TA indication indicated by being connected to the eNB. In particular, similar to the discovery process, D2D communication between two UEs not connected to the eNB can be performed without a TA indication. This is because, since the two UEs are not connected to the eNB, minimizing an impact of an eNB-UE link operation capable of being obtained by performing D2D communication according to a TA indication is meaningless.

To this end, when a UE generates a discovery signal, the UE can generate a different signal according to whether or not the UE is connected with an eNB (e.g., whether the UE is in an idle mode or a connected mode) to enable a different UE, which has detected a discovery signal, to identify a state of the UE. Or, although a UE performs uplink transmission according to a TA in a manner of being connected to the eNB, if a currently used TA value is given by a TA value equal to or less than a prescribed level and the UE is able to perform D2D communication without a TA indication, the UE is able to generate a discovery signal as if the UE was in the idle mode. In order to include the aforementioned case, when the UE generates a discovery signal, the UE can generate a different signal according to whether or not a TA value currently used by the UE is equal to or less than a prescribed level (in case of the idle mode, it is assumed that a TA is equal to or less than the prescribed level). In this case, when a specific UE is about to perform D2D communication according to a TA indication in a manner of being connected to the eNB, if it is determined as a counterpart UE is in the idle mode, the specific UE can report the fact to the eNB to make the eNB indicate the counterpart UE to perform access attempt and the UE can perform uplink subframe synchronization according to a TA value. By doing so, the UE can perform D2D communication while maintaining a TA value of the UE.

Figure 3:
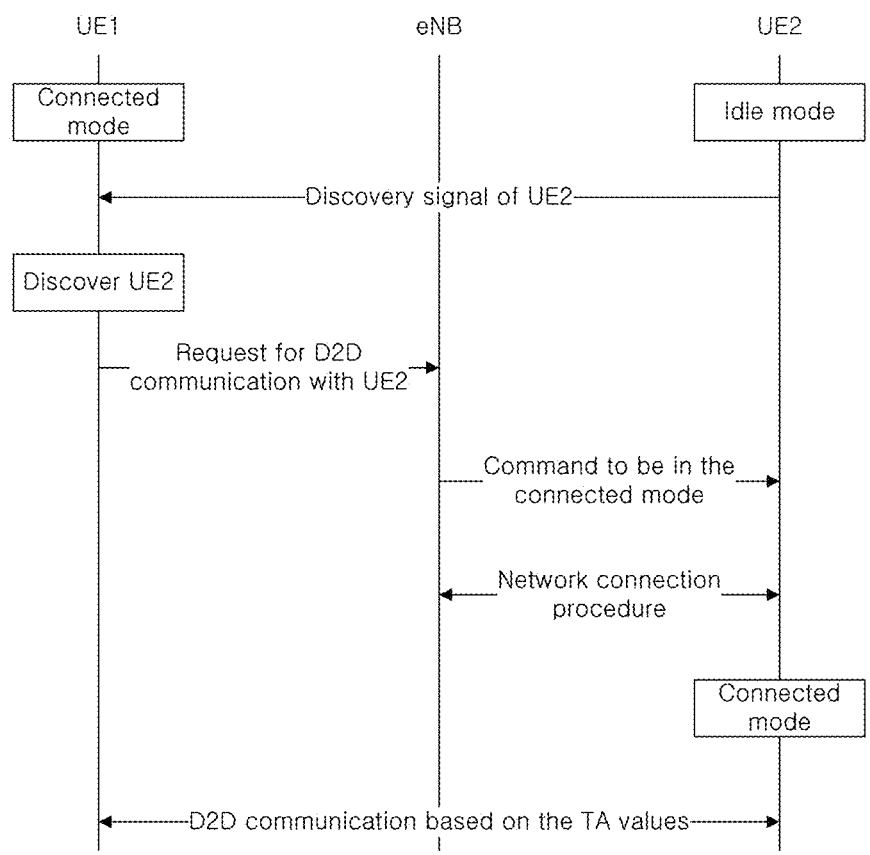
FIG. 3 is a diagram for explaining an example of performing D2D communication with a UE in an idle mode.

FIG. 3 is a diagram for explaining an example of performing D2D communication with a UE in an idle mode.

In particular, FIG. 3 shows an example of the aforementioned signal exchange process. Referring to FIG. 3, a UE1 is connected with an eNB and a UE2 is not connected with the eNB. According to this embodiment, the UE1 is able to inform the eNB of a fact that the UE2 is in an idle mode while making a request for performing a D2D communication with the UE2 to the eNB.

In the following, a frame structure capable of efficiently performing D2D without a TA indication is explained for a FDD system and a TDD system, respectively.

FDD Case

Figure 4:
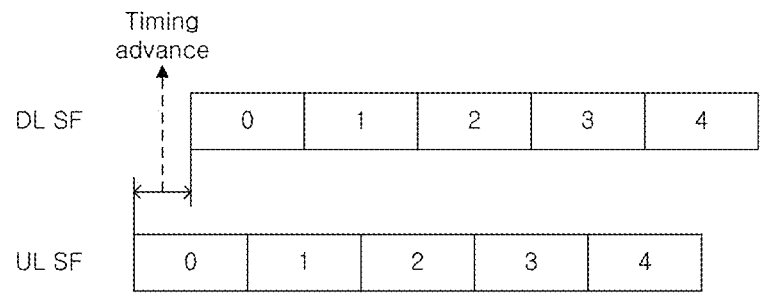
FIG. 4 is a diagram for DL and UL subframe boundaries in a general FDD situation.

FIG. 4 is a diagram for DL and UL subframe boundaries in a general FDD situation.

As shown in FIG. 4, a UL subframe starts prior to a DL subframe as much as a TA value on the basis of the DL subframe.

Figure 5:
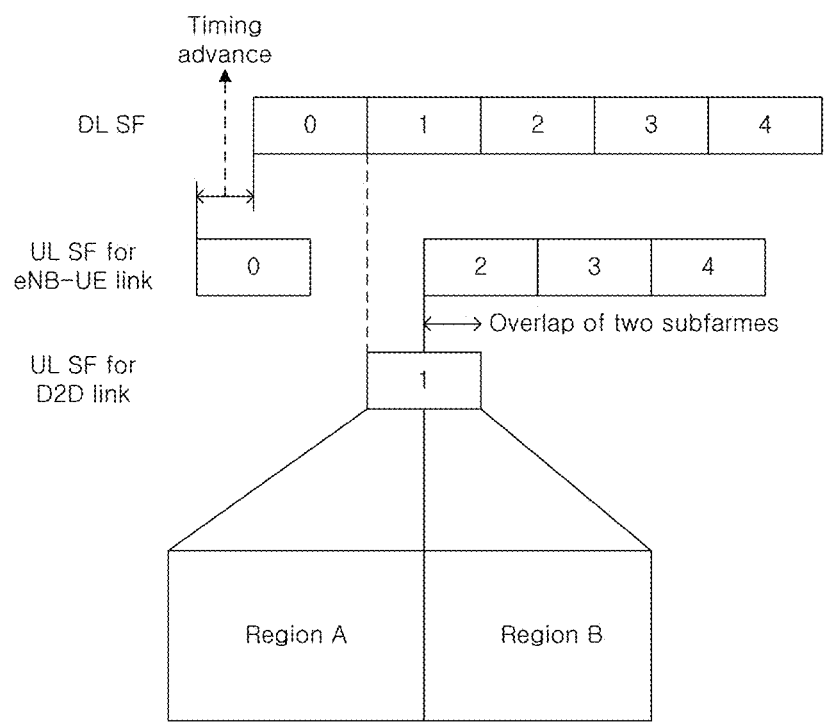
FIG. 5 is an exemplary diagram for a situation that D2D is operating in a UL subframe 1 in the situation shown in FIG. 4.

FIG. 5 is an exemplary diagram for a situation that D2D is operating in a UL subframe 1 in the situation shown in FIG. 4.

As mentioned in the foregoing description, assume that TA is set to 0 and a boundary matched with a DL subframe exists in a situation that D2D is performed. As shown in the drawing, since a latter part (represented as a region B) of a subframe 1 for a D2D link is overlapped with a subframe 2 of an eNB-UE link, if the subframe 2 is used as the eNB-UE link, a D2D operation can be performed in a region A only.

When a subframe boundary of the D2D link and a subframe boundary of the eNB-UE link are not matched with each other, a problem may occur. In the following, a method of solving the problem is explained.

Figure 6:
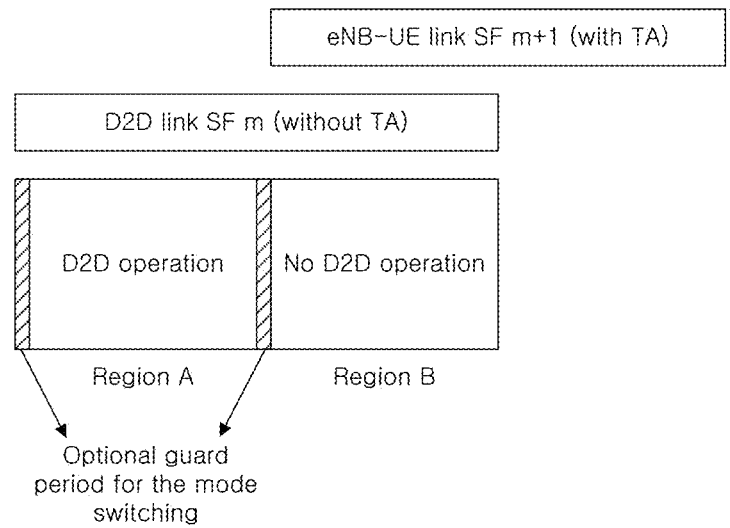
FIG. 6 is a diagram for explaining a scheme of managing D2D in such a region at which overlap does not occurs between subframes as a region A shown in FIG. 5.

Method 1: D2D is managed in such a part at which overlap between subframes does not occur as the region A shown in FIG. 5 only. FIG. 6 is a diagram for explaining a basic operation principle of the method 1.

To this end, an eNB can deliver information on a position or a length of an area occupied by a region A in a subframe to a UE via signaling such as RRC or system information.

Since it is necessary for a region B to include a following eNB-UE link subframe including a maximum TA value of a UE, the eNB can determine a length of the region A in consideration of a cell radius of the eNB, and the like. In addition, a guard period during which the UE is able to perform operation mode switching between an eNB-UE operation and a D2D operation (e.g., switching between transmission in the eNB-UE link and reception in the D2D link) can be set to a first part and/or a last part of the region A for partial time. The guard period is essential for a UE that performs switching between transmission and reception. Yet, the guard period may not appear to a UE that performs identical transmission/reception operation in two subframes adjacent to each other without performing switching. As an example, signal transmission is performed without the guard period for a UE consistently transmitting a signal in many subframes. On the contrary, a UE, which performs switching to reception from transmission in a neighboring subframe, configures partial time as a guard period and may be able to receive a signal via the remaining area only.

Since it is necessary to basically perform an eNB-UE link operation of the subframe 2 in the region B, the region B is unable to be utilized as a D2D link.

Figure 7:
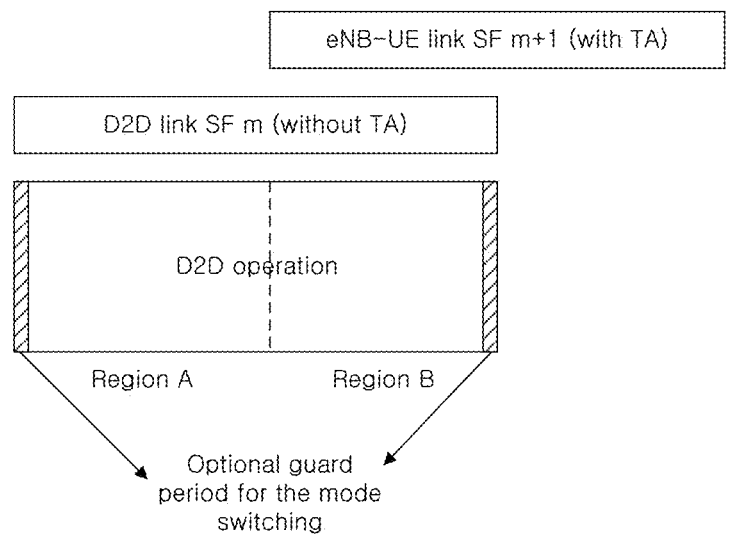
FIG. 7 is a diagram for explaining a scheme of using both a region A and a region B for D2D usage.

Method 2: Both the region A and the region B mentioned earlier in FIG. 5 are used for the usage of D2D. FIG. 7 is a diagram for explaining the method 2. As shown in FIG. 7, there is a restriction in using a following subframe as an eNB-UE link.

As a simple method, it may not perform an eNB-UE operation in a following subframe (an SF m+1 in FIG. 7). If a UE is indicated to transmit a specific signal (UL ACK/NACK, periodic channel state information report, sounding reference signal, or a semi-persistent scheduling signal) in a following subframe, the transmission may move to such a predetermined position as a next subframe or the transmission itself can be omitted. Or, in order to more efficiently utilize a resource, it may be able to perform an eNB-UE operation using a partial time resource (i.e., a part not overlapped with the region B among time resources of the subframe m+1). Regarding this, it shall be explained in detail in method 3 in the following.

Figure 8:
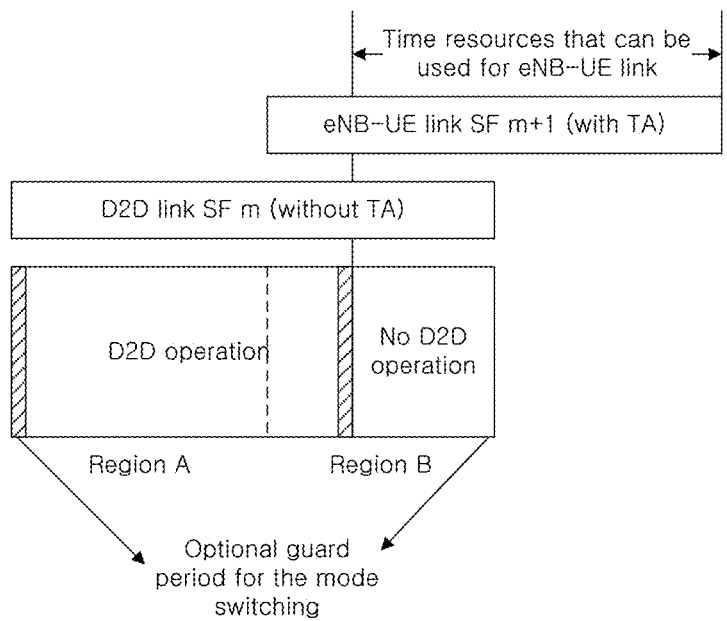
FIG. 8 is a diagram for explaining a method of performing a D2D operation in a partial region of a region B shown in FIG. 5.

Method 3: This method corresponds to an intermediate form of the methods 1 and 2. According to the method 3, a D2D operation is performed in a partial area of the region B. The method 3 can be effective when the following subframe mentioned earlier in the method 2 is partially utilized for an eNB-UE link. FIG. 8 shows an example of the method 3. According to FIG. 8, if a partial area of the region B is utilized for D2D, there may exist a restriction in operating the eNB-UE link during partial time of a first part of a subframe m+1.

As shown in FIG. 8, when the eNB-UE link is operated using partial time only, the method 3 is effective when a format of a signal transmitted and received via the eNB-UE link is restricted by several types in advance. Specifically, as shown in FIG. 7, if the whole area of the region B is utilized for D2D, it is necessary for a signal transmitted and received via the eNB-UE link in the subframe m+1 to have signal formats of various types. This makes implementation of a UE to be complicated. Hence, if the signal formats used in the subframe m+1 are restricted to one or more types, a format best matched with a current status is selected from among the restricted formats, and the selected format occupies a partial area of the region B only, the remaining part can be utilized for a D2D operation together with the region A.

Examples of an eNB-UE operation capable of being performed in a following subframe of a D2D subframe using a partial time resource are described in the following.

(1) It may be able to use a format performing transmission using a partial symbol only located at the latter part of a subframe while transmitting PUSCH or PUCCH. An eNB can notify the number of symbols to be used for transmitting PUSCH or PUCCH in a subframe. It may be able to transmit PUSCH or PUCCH in a single slot only by utilizing a characteristic that a similar signal format is configured in a manner of changing a frequency position between two slots included in a subframe.

(2) It may be able to transmit an SRS which is transmitted in a single symbol only. In this case, if a plurality of symbols are available in a following subframe, an SRS can be transmitted in each of a plurality of the symbols. To this end, an eNB can notify the number of symbols to be used for transmitting an SRS in the following subframe.

(3) It may be able to transmit a PRACH preamble which is used in several symbols only. Similarly, the eNB is able to notify the number of symbols to be used for transmitting PRACH in a following subframe.

Method 4: This method corresponds to an intermediate form of the methods 1 and 2. According to the method 4, a D2D operation is performed in a partial area of the region A only. The method 4 can be effective when the whole of the following subframe mentioned earlier in the method 1 is utilized for the eNB-UE link.

Figure 9:
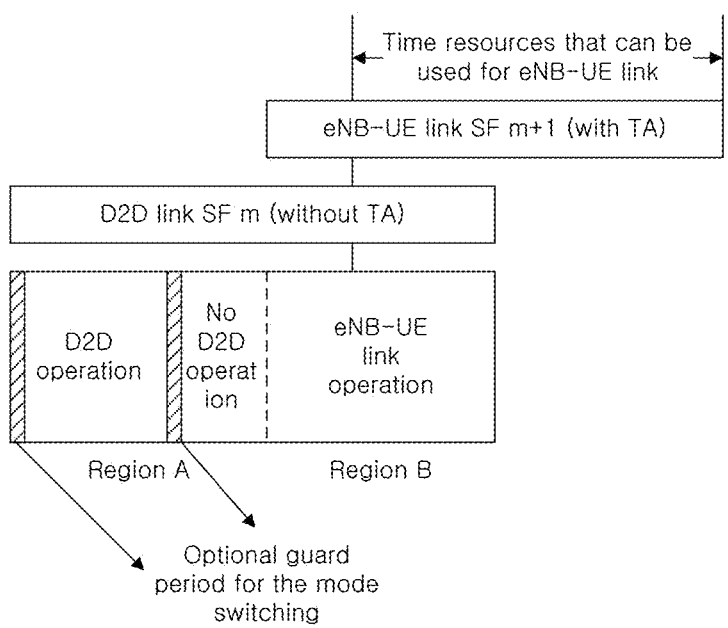
FIG. 9 is a diagram for explaining a method of performing a D2D operation in a partial region of a region A shown in FIG. 5.

FIG. 9 shows an example of the method 4. The eNB-UE link can be operated in the whole area of the subframe m+1 by not operating D2D in the region B. As shown in FIG. 9, the method 4 operates the D2D link using a partial time of the region A only. The method 4 is more effective when a format (i.e., a length of time in use) of a signal transmitted and received via the D2D link is restricted by several types in advance.

Specifically, as shown in FIG. 6, if the whole area of the region A is utilized for D2D, an area occupied by a signal transmitted and received in a subframe m via the D2D link may vary according to an actually applied TA value. Hence, it is necessary to have signal formats of various types. This makes implementation of a UE to be complicated. Hence, if a signal format used in the subframe m is restricted to one or more types, a format best matched with a current status is selected from among the restricted formats, and the selected format occupies a partial area of the region A shown in FIG. 9, it may be able to make the remaining part not to be used for D2D usage.

In the aforementioned embodiments, a guard period for switching a mode of a UE may appear at timing at which a D2D operation starts or timing at which the D2D operation ends only. Or, the guard period may not appear at both timings (e.g., a UE capable of performing mode switching with very fast speed). Or, it may be able to make all or a part of the guard period not appear by additionally assigning an appropriate offset to a subframe boundary of a D2D subframe.

Figure 10:
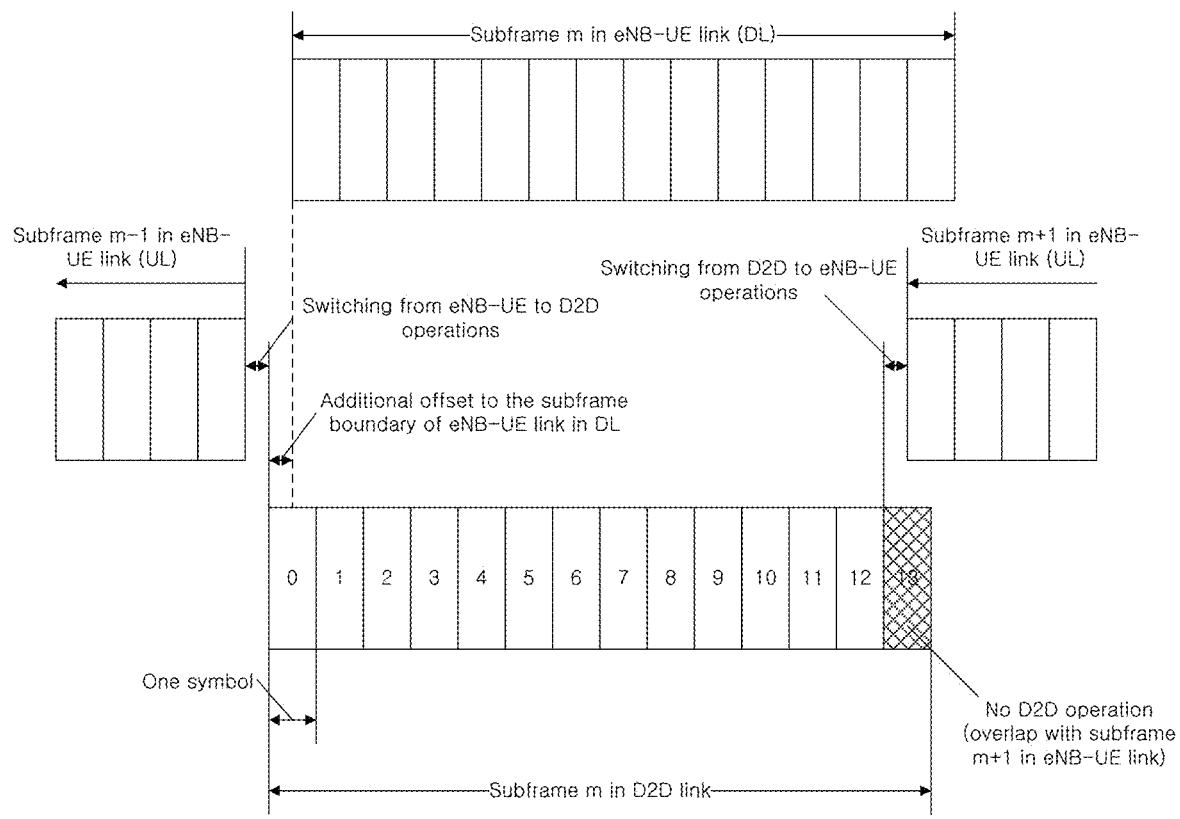
FIG. 10 is a diagram for a case that a half or less than a half of a symbol is used for switching a mode.

FIG. 10 is a diagram for a case that a half or less than a half of a symbol is used for switching a mode.

In an example of FIG. 10, it is assumed that a D2D operation is impossible because a last symbol among the total 14 symbols in a subframe is assigned to the region B (i.e., TA becomes a symbol length) by assuming the aforementioned method 1. In this case, although it is assumed as one subframe includes 14 symbols in total, the number of symbols constructing a subframe may vary according to a configuration for D2D communication, i.e., a length configuration of a cyclic prefix. Referring to FIG. 10, it is assumed that a subframe of a D2D link starts prior to a DL subframe boundary of an eNB-UE link as much as a prescribed offset (e.g., as much as time corresponding to a half of time of a symbol). According to the assumption, a UE preferentially performs an operation of the eNB-UE link in a UL subframe m−1 and then performs mode switching for a D2D operation. Then, a prescribed offset is added to DL reception timing, a boundary of an early starting D2D subframe m appears, and the D2D operation is performed from the boundary. After the D2D operation is performed until a symbol 12, the UE switches a mode to the eNB-UE link again at the first part of a symbol 13, which is not usable because that the symbol 13 is partially overlapped with a UL subframe m+1 of the eNB-UE link. Subsequently, the UE performs an eNB-UE operation in a UL subframe m+1.

Figure 11:
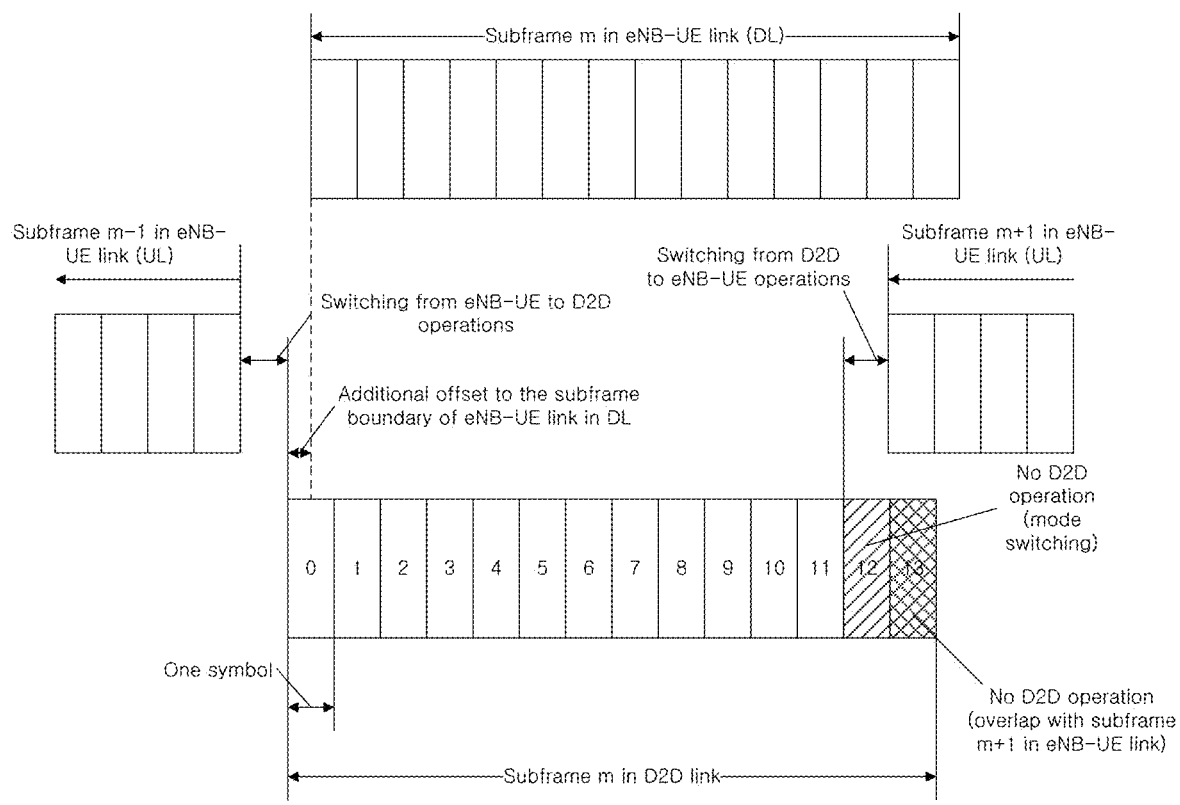
FIG. 11 is a diagram for a frame structure capable of being used by a UE of which TA is greater than TA shown in FIG. 10.

In order to perform the operation shown in FIG. 10, it is necessary to assign at least TA equal to or greater than a prescribed value. By doing so, it is able to secure time for switching a mode between an end point of the UL subframe m−1 of the eNB-UE link and a start point of the subframe m of the D2D link. To this end, an eNB can perform TA indication to make the at least TA equal to or greater than the prescribed value to be assigned to all UEs. The TA indication can also be comprehended as a UL subframe boundary of the eNB appears little bit earlier than a DL subframe boundary from the first. In this context, FIG. 10 corresponds to a case of a UE including a minimum TA among UEs connected to the eNB that performs the aforementioned operation. As shown in FIG. 11, it is necessary to reduce the number of symbols capable of performing D2D operation in the subframe m in response to a UE including TA greater than the minimum TA.

As shown in FIG. 10, if a TA value equal to or greater than a prescribed level is configured, the number of OFDM symbols capable of being used for D2D changes in a subframe m. One of methods for solving the aforementioned problem is to make various formats of a signal transmitted and received via a D2D link and select a format appropriate for the number of available OFDM symbols in each situation from the various formats. In this case, since the TA value is differently configured according to a UE, an eNB determines a signal transmission/reception format of a D2D link (or the number of OFDM symbols available for D2D) on the basis of a maximum value of TA values in response to UEs belonging to a cell and the eNB can inform the UE of the determined format via system information or a signal such as RRC. Having received the format, although the UE is able to use more symbols for D2D in a TA value of the UE, the UE transmits and receives a D2D signal in accordance with the format signaled by the eNB to transceive a correct signal with a UE including a different TA value (in general, the UE uses symbols less than the number of OFDM symbols capable of being used in the TA value of the UE).

When the aforementioned operation is performed, if too many D2D transmission/reception signal formats are made, implementation of a UE becomes excessively complicated. In this viewpoint, it may be preferable to restrict the number of D2D transmission/reception signal formats to several formats, use a most appropriate format instead of using all available symbols for D2D, and perform an operation of not utilizing a part of symbols for a D2D link usage.

Figure 12:
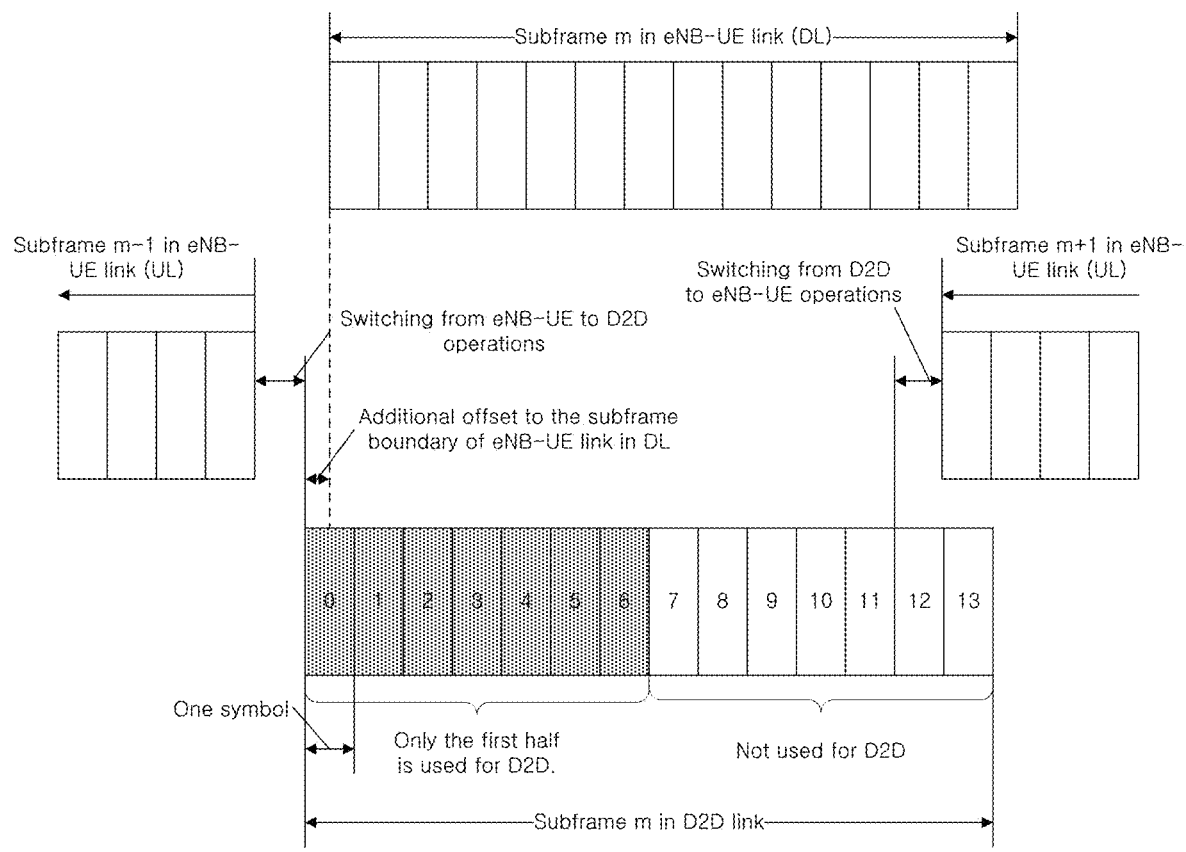
FIG. 12 is a diagram for explaining a case that first half of TA is utilized for D2D and second half of the TA is not used in case of providing TA identical to TA shown in FIG. 11.

FIG. 12 shows an example of the aforementioned operation. When a TA identical to the TA mentioned earlier in FIG. 11 is given, OFDM symbols #0 to #6 corresponding to a first half of a subframe are utilized for D2D and the rest of symbols are not used. In this case, as shown in FIG. 10, if a relatively small TA is given, OFDM symbols #0 to #12 can be utilized for D2D and, as shown in FIG. 13, it can be comprehended as there exist two types of D2D transmission and reception formats.

Figure 13:
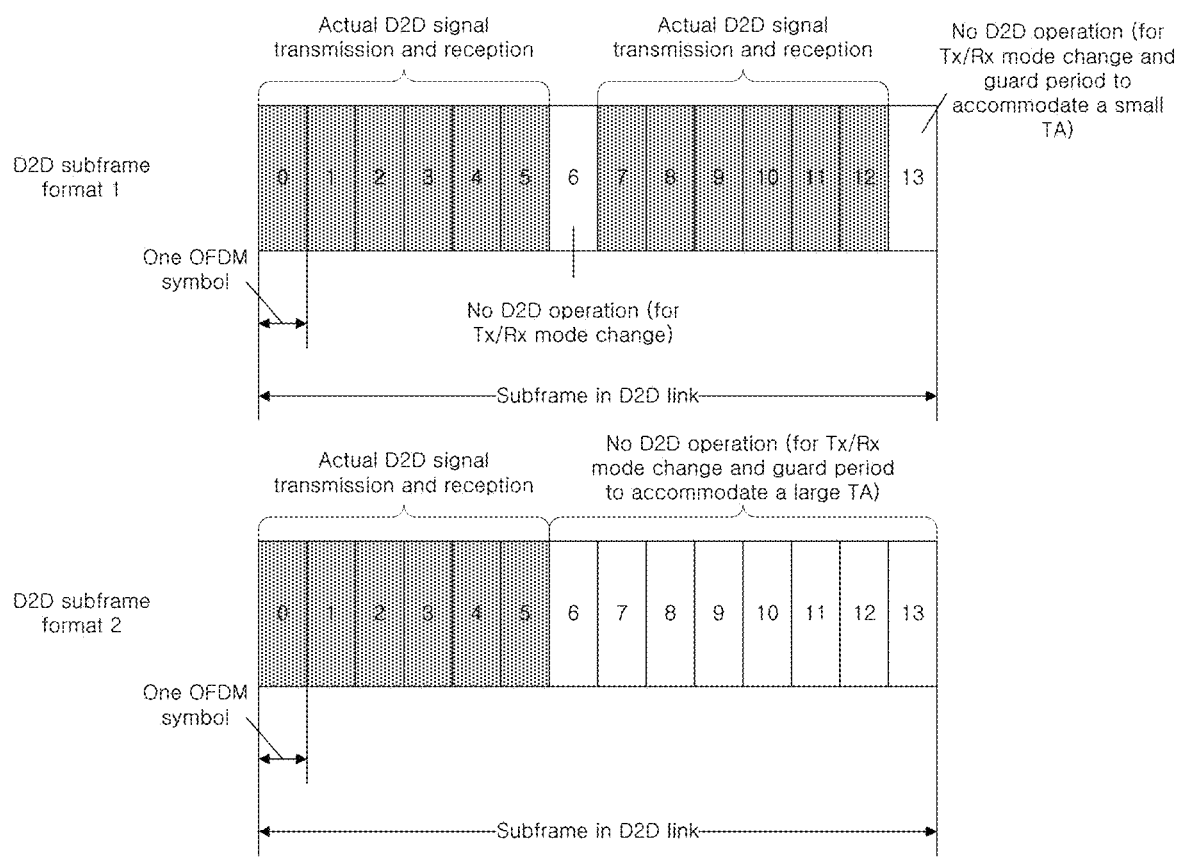
FIG. 13 is a diagram for explaining a scheme that a format of a D2D transmission and reception signal is determined in a slot unit and a last symbol of a slot is used for the usage of switching a mode for a D2D or an eNB-UE link transmission and reception operation in a next slot.

In the embodiment of FIG. 13, a part of OFDM symbols utilized for D2D may not be utilized for transmitting and receiving a signal for transmission/reception mode switching of a UE. In particular, a symbol #6 may not be utilized for transmitting and receiving a signal. In FIG. 13, assume that a format of a D2D signal is determined in a unit of a slot corresponding to a half of a subframe and a last symbol of a slot is used for the usage of switching a mode for a D2D link or an eNB-UE link transmission/reception operation. As a result, as shown in FIG. 10, when a small TA is given, it is able to utilize all of the two slots for D2D transmission and reception by applying a D2D subframe format 1 (i.e., since it is able to switch a mode using the symbol #6, it may be able to differently configure a transmission/reception mode in each slot). On the contrary, as shown in FIG. 11, when a big TA is given, it may be able to utilize a first slot only for D2D transmission and reception by applying a D2D subframe format 2.

In particular, since a D2D subframe structure shown in FIG. 13 uses a slot corresponding to a relatively short time as a basic unit, the D2D subframe structure can be usefully applied when a discovery signal, which delivers a signal of a relatively small amount, is delivered. If a TA value is big and a D2D subframe format 2 using a single slot only is applied, it may be able to solve a resource deficiency problem by assigning more subframes for the usage of D2D.

Figure 14:
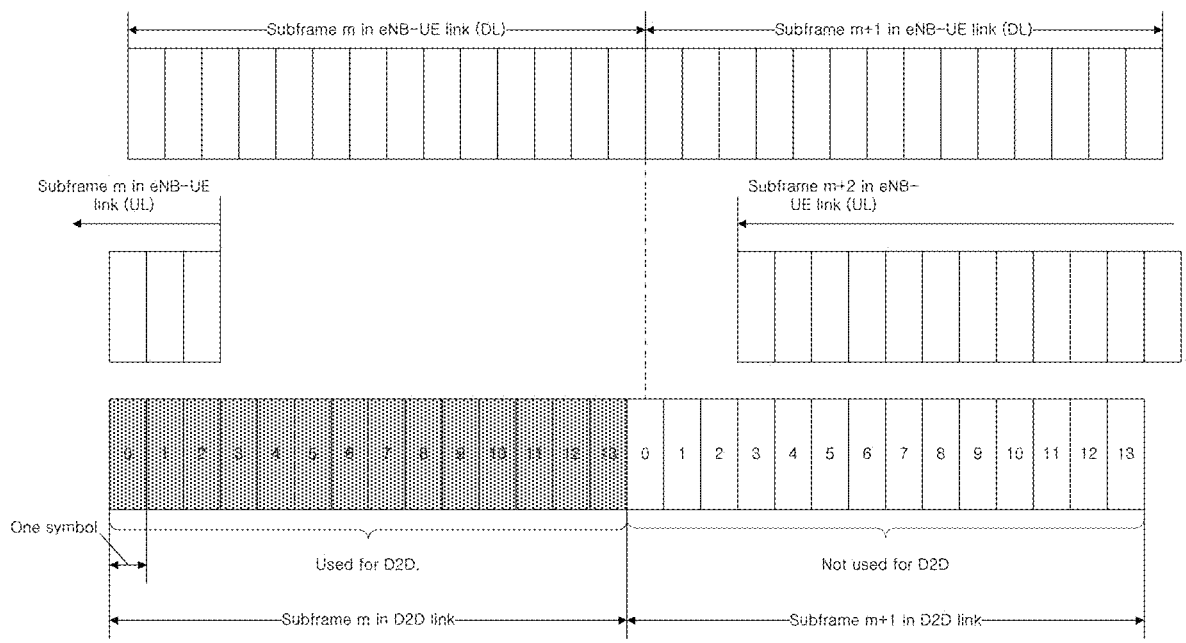
FIGS. 14 and 15 are diagrams for different examples of a D2D frame structure.

If a TA value becomes bigger and a partial area of a first slot of a D2D subframe and an area of a UL subframe of a next eNB-UE link are overlapped with each other, as shown in FIG. 14, two contiguous subframes (a subframe #m and a subframe m+1) are assigned as a D2D subframe. In this case, the subframe m+1 is not utilized for D2D and an eNB-UE link operation of a subframe m+2 is performed in most part. At the same time, a D2D operation can be performed using the subframe m. In this case, since it is able to use all symbols of the subframe m, a D2D subframe format 1 can be applied in the subframe m. In FIG. 13, the subframe m+1 can be regarded as a null D2D subframe. The null D2D subframe can be designated as a D2D subframe but performs no D2D operation.

The null D2D subframe can be considered as a D2D subframe format. An eNB can inform a UE of a subframe used as a D2D subframe (i.e., a subframe in which a D2D operation not following a TA indication is performed, e.g., a subframe in which discovery is performed) and a format of each D2D subframe.

Figure 15:
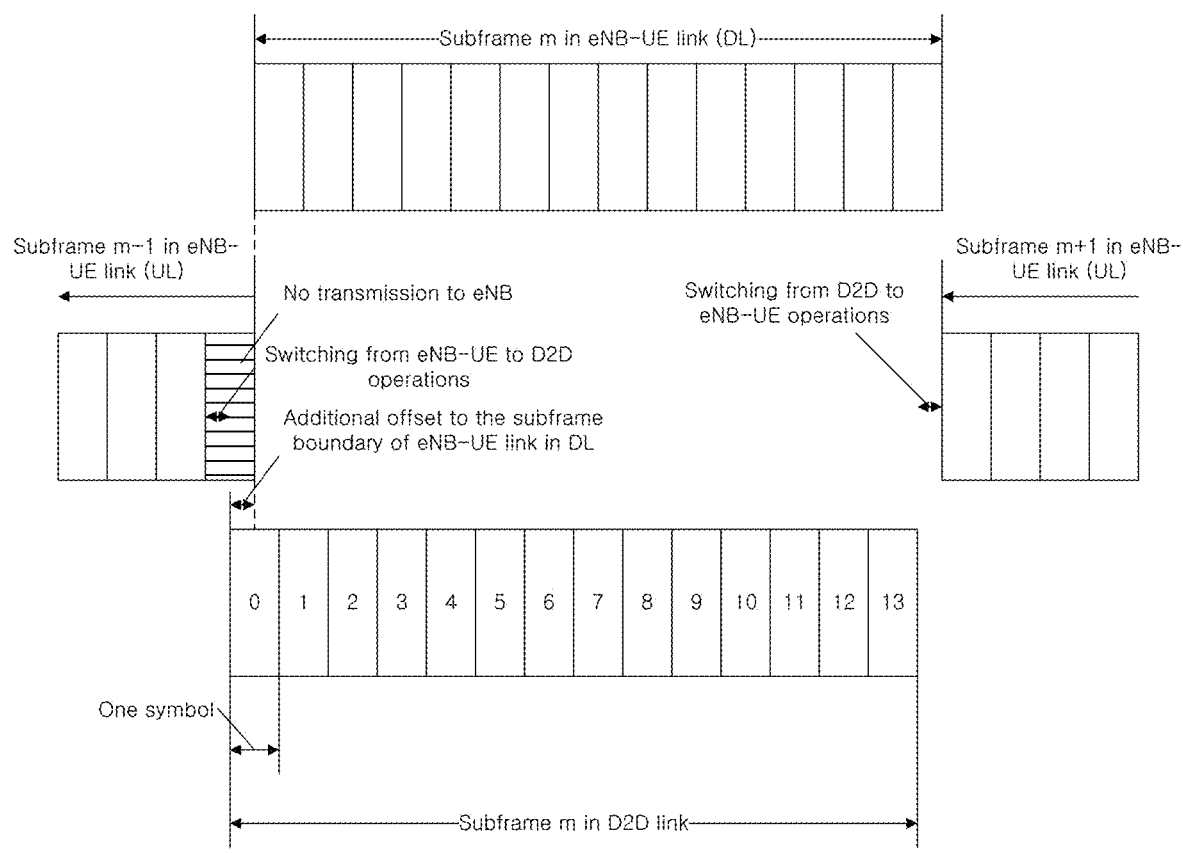

FIG. 15 shows a case that TA becomes very small in the example of FIG. 10.

In this case, the last symbol of a subframe m−1 is partly overlapped with a first symbol of a subframe m. In this case, it may be able to perform an operation of switching a mode without using the last symbol of the subframe m−1. In particular, the operation can be effective when a UE, which has performed UL transmission to an eNB in the D2D subframe m−1, receives a D2D signal in the subframe m. This is because it is not necessary for the UE performing D2D signal transmission in the subframe m to switch a mode between the subframe m−1 and the subframe m. As an example of the operation of not using the last symbol of the subframe m−1, the eNB configures the subframe m−1 as a subframe for an SRS and may be able to make the UE terminate PUSCH or PUCCH transmission to the eNB prior to the last symbol in the subframe. In particular, when a UE receives a D2D signal in the subframe m, if the UE transmits a signal to the eNB in the subframe m−1 and a TA value equal to or less than a prescribed level (e.g., time for mode switching) is given, the eNB can control transmission indication not to be performed for the last symbol of the subframe m−1 (via an appropriate SRS configuration). If there is no control of the eNB, transmission can be automatically configured not to be performed (e.g., SRS is not transmitted or PUSCH/PUCCH transmission is terminated prior to the last symbol of the subframe m−1).

If the UE transmits a D2D signal in the subframe m, since it is not necessary to perform mode switching, a partial area of the last symbol of the subframe m−1 can be utilized for transmitting a signal to the eNB. As an example, it may be able to configure to transmit the aforementioned SRS. Or, in order to have unity of operation, it may be able to regulate that transmission to the eNB is not performed in the symbol.

There exists a difference between FIG. 10 and FIG. 15 in that the last symbol of the subframe m has a part capable of being used for D2D usage. In this case, the eNB can appropriately configure the operations of FIGS. 10 and 15 according to a TA value. Or, in order to have unity of operation, as shown in FIG. 15, the last symbol can be configured not to be used for D2D although a TA value is small.

In the embodiments mentioned earlier in FIGS. 10 to 15, if a UE performs mode switching between transmission and reception in a single subframe, it is necessary to configure an appropriate symbol as an additional guard period. As an example, when the structure shown in FIG. 10 is used, if a UE performs a different transmission and reception operation in the first half and the latter half of the D2D subframe, the last symbol of the first half, i.e., a symbol 6, is not used for transmitting and receiving a D2D signal and the symbol can be configured as a guard period to make symbol configurations of the first half and the latter half to be identical to each other.

Or, it may be able to configure a D2D subframe to start later as much as an offset compared to DL subframe boundary timing by placing the aforementioned additional offset on an opposite direction.

Figure 16:
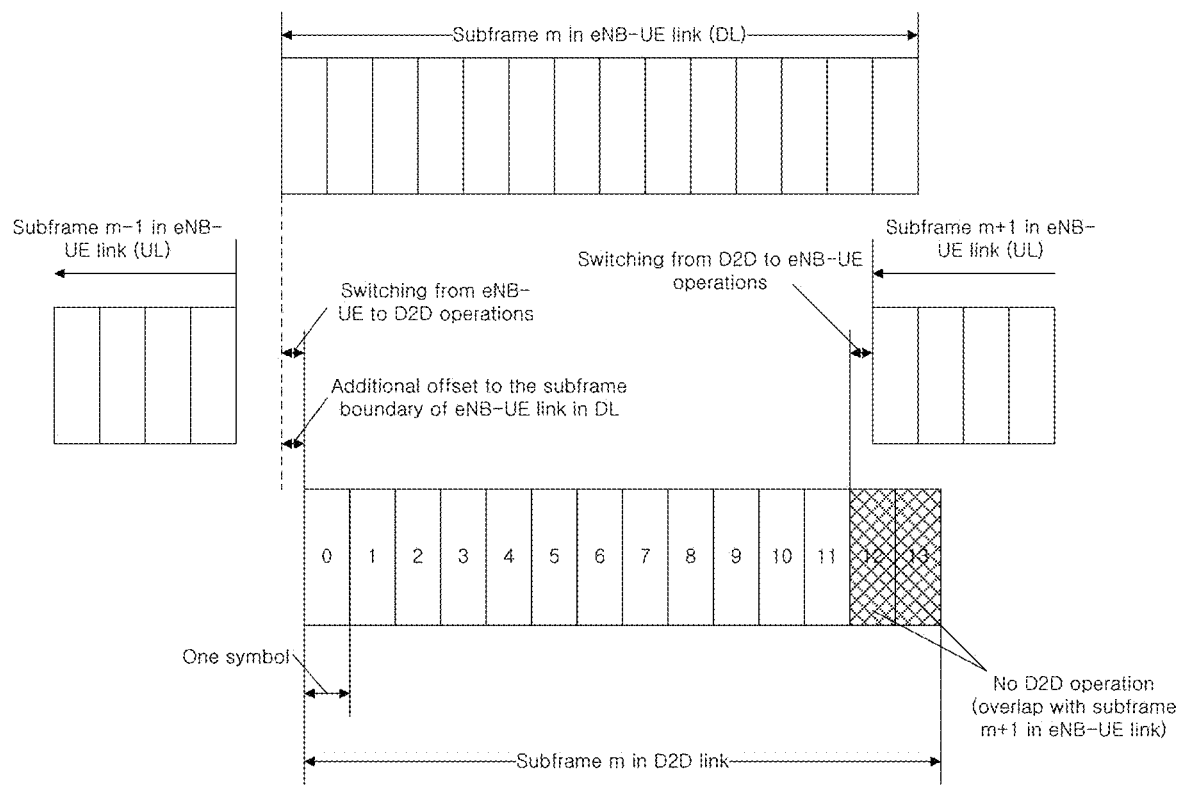
FIG. 16 is a diagram for a case of placing an offset on an opposite direction in a situation identical to FIG. 10.

FIG. 16 is a diagram for a case of placing an offset on an opposite direction in a situation identical to FIG. 10.

A UE assumes that a subframe of a D2D link starts at timing later as much as a prescribed offset from a received DL subframe boundary and performs mode switching during the corresponding time. Since a last symbol of a subframe in which D2D is performed is overlapped with a UL subframe of an eNB-UE link, it is unable to use the last symbol for D2D usage and mode switching is performed again using a part of the unavailable time. This method has a merit in that prescribed mode switching time can be secured before a D2D subframe starts although a UE is very close to an eNB and a TA value is almost 0. In particular, D2D use of an initial symbol is always guaranteed. If necessary, a position of a last symbol capable of being used for D2D can be appropriately configured.

An operation of FIG. 16 can be comprehended as a D2D subframe starts from a symbol #1 which is identically assumed in the operation of FIG. 10 (i.e., a D2D subframe starts earlier than a DL subframe as much as an offset and a first symbol (symbol 0) is not usable for D2D). As shown in FIG. 16, when a D2D subframe starts earlier than an eNB-UE link subframe as much as an offset, it may be able to select an appropriate format from among the formats shown in FIGS. 13 and 14.

As mentioned in the foregoing description, the number of symbols and positions of the symbols capable of being used for transmitting and receiving a D2D signal may vary depending on a TA value used by each UE. An eNB configures appropriate symbols for transmitting and receiving a D2D signal in consideration of TA values of UEs belonging to a cell of the eNB. However, for example, a maximum value of TA anticipated by the eNB may be smaller than an actual maximum value of TA possessed by the UE. In this case, it may have a case that the UE is unable to use a part of the D2D symbols configured by the eNB (when the UE considers a TA value of the UE and mode switching time). If the case happens, the UE can report it to the eNB. The report can include such information as a current TA value, mode switching time required by the UE (or, total required guard period time resulted from adding the mode switching time to the current TA value), and a length of time period incapable of being used by the UE. In addition, the UE can inform the eNB of a type of a D2D subframe format capable of being operated in a current situation of the UE (or a D2D transmission/reception signal region including a maximum length).

When the aforementioned embodiments of the present invention are applied, it may be able to transmit a separate signal for helping a reception preparing operation of a reception UE including time/frequency synchronization before a D2D signal including control information and data information to be transmitted by a transmission UE is actually transmitted. In the following, the separate signal, which is transmitted prior to the D2D signal including the control/data information, is referred to as a preamble. In general, the preamble corresponds to a signal known to the transmission UE and the reception UE in advance. Since the preamble is transmitted for such an advance preparation process as time/frequency synchronization acquisition, gain control of a reception amplifier, and the like of the reception UE before the D2D signal is received, if time taken for transmitting the preamble is sufficient for the preparation process, it is not necessary to occupy one or more OFDM symbol time.

Figure 17:
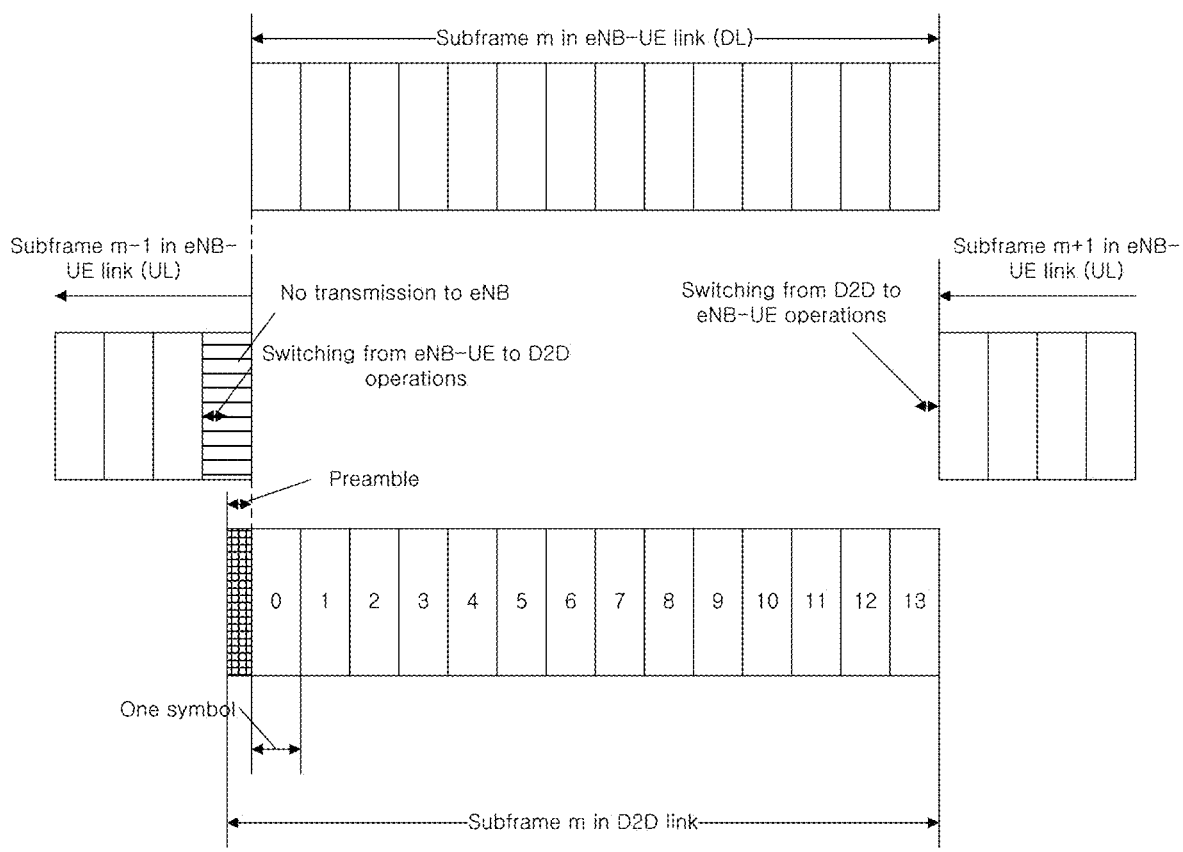
FIG. 17 is a diagram for a case that a point which is advanced as much as a prescribed offset from a DL subframe boundary obtained by a UE shown in FIG. 10 is considered as a timing at which a D2D subframe starts.

FIG. 17 is a diagram for a case that a point which is advanced as much as a prescribed offset from a DL subframe boundary obtained by a UE shown in FIG. 10 is considered as a timing at which a D2D subframe starts (or a timing at which D2D transmission starts).

Referring to FIG. 17, a preamble for synchronization is transmitted before regular D2D symbols are transmitted. Specifically, a symbol #0 corresponding to a first regular symbol of the regular D2D symbols is transmitted from a boundary point of a DL subframe obtained by a UE. In particular, a length of an offset assigned to the boundary of the DL subframe is matched with transmission time of a preamble. FIG. 17 shows a case that TA of 0 is assigned to the UE. As a result, it is impossible to transmit a signal to an eNB at a last symbol of a subframe m−1. Instead, transmission is terminated at a symbol immediately before the last symbol, switching between transmission and reception is performed for a prescribed time, and then a preamble is transmitted and received. As shown in FIG. 17, if time for switching between transmission and reception and time for transmitting a preamble are added up, it becomes one OFDM symbol time or time equal to or less than one OFDM symbol time. If the above-mentioned structure is appropriately used, it is able to minimize the loss of OFDM symbols caused by the switching and the preamble. Referring to the example of FIG. 17, if it is assumed that a symbol #13 of a subframe m is unavailable due to the overlap with a subframe m+1, it may be able to use 13 symbols in total. If it is able to guarantee that a signal of a UE is not transmitted in the subframe M+1, it is able to utilize the symbol #13 of the subframe m for D2D as well. In this case, when a TA value greater than 0 is assigned to the UE, if the sum of the TA value and switching time necessary between the subframe m and the subframe m+1 is equal to or less than one OFDM symbol time, it may not utilize the symbol #13 for D2D to enable an operation of eNB-UE link to be performed from a first symbol of the subframe M+1.

Figure 18:
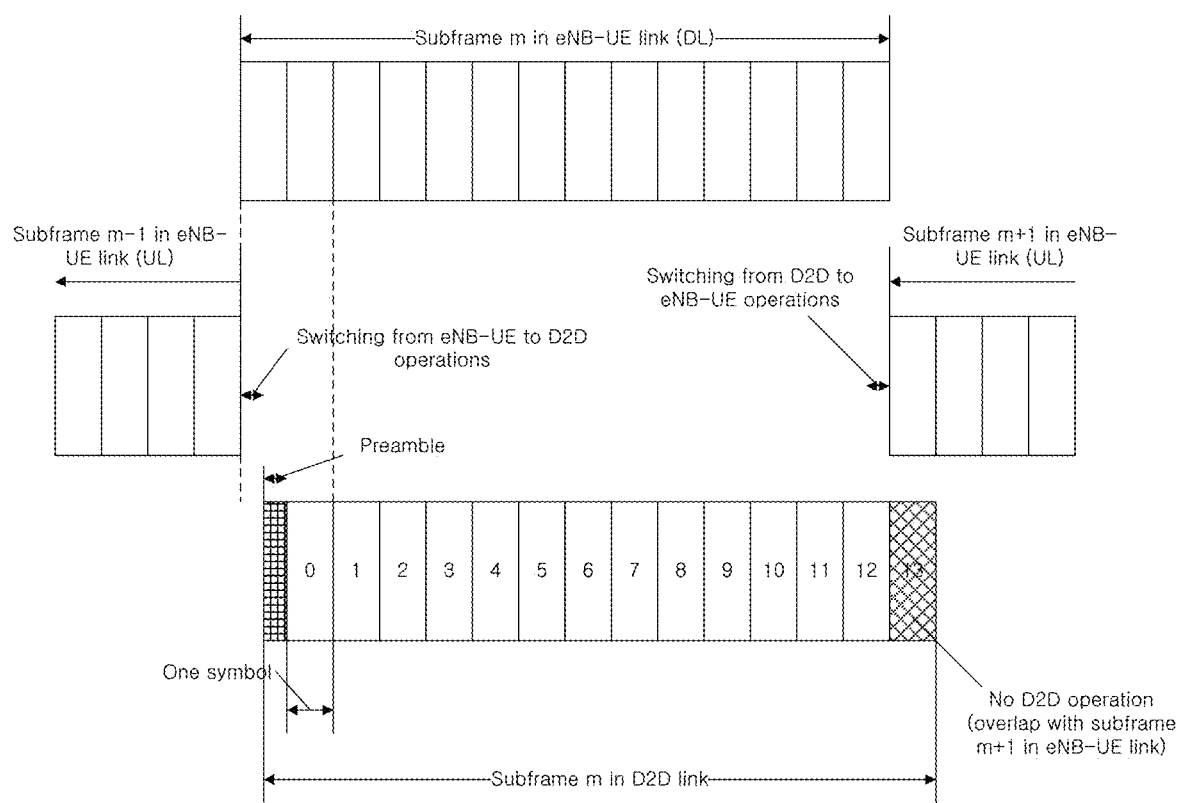
FIG. 18 is a diagram for a case that a point which is delayed as much as a prescribed offset from a DL subframe boundary obtained by a UE is considered as a start point of D2D transmission by applying the principle mentioned earlier in FIG. 16.

FIG. 18 is a diagram for a case that a point which is delayed as much as a prescribed offset from a DL subframe boundary obtained by a UE is considered as a start point of D2D transmission by applying the principle mentioned earlier in FIG. 16.

In this case, the sum of a length of an offset and time for transmitting a preamble is identical to one OFDM symbol time. As a result, it may have a characteristic that a symbol #0 including a D2D signal and a second symbol of a DL subframe are transmitted at the same time. In this case, if it is necessary to have a switching period smaller than one OFDM symbol to make a reception UE perform switching between an operation of transmitting a signal to an eNB and an operation of receiving a D2D signal, the remaining section except the switching period among OFDM symbol time in which the switching period exists can be used for the purpose of transmitting a preamble. By doing so, it may be able to minimize the loss of OFDM symbol caused by the switching period and the preamble. If a transmission UE or a reception UE transmits a signal in the subframe M+1, it is unable to utilize symbols #12 and #13 for D2D. In this case, it is necessary to guarantee switching between reception and transmission using partial time of the symbol #12.

Figure 19:
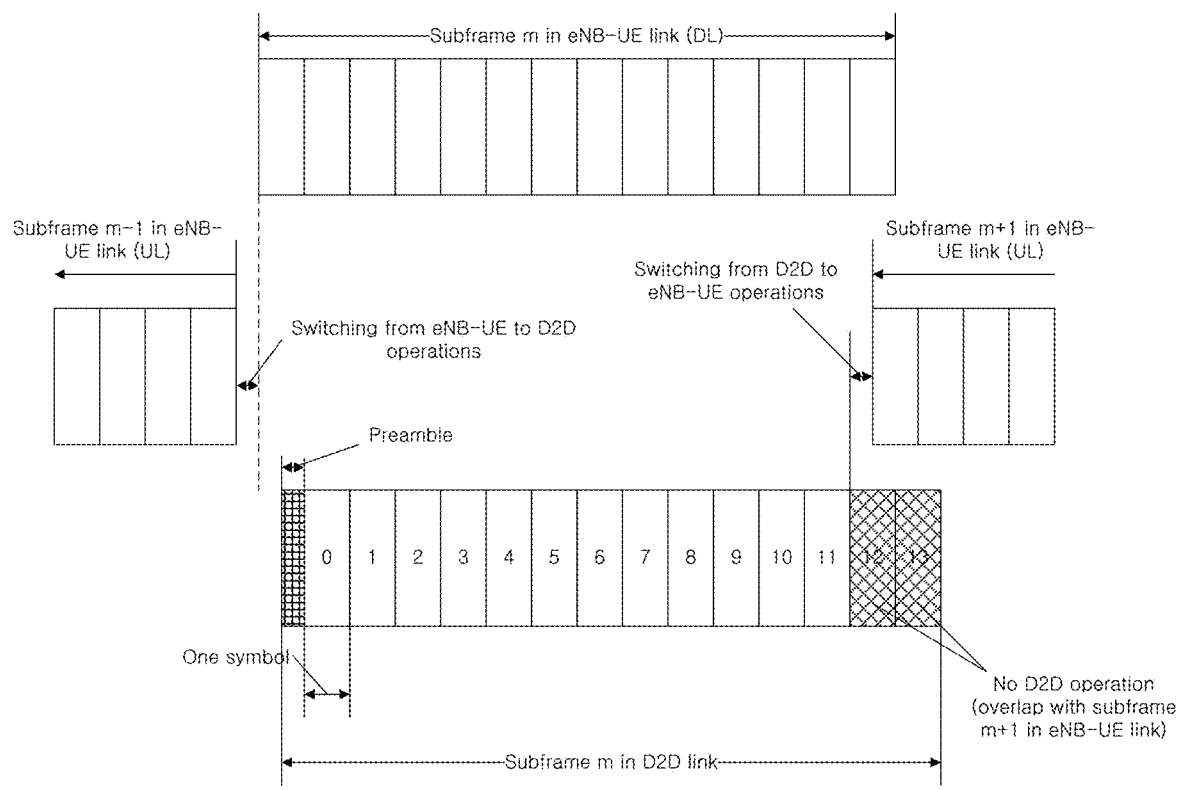
FIG. 19 is a diagram for a situation that TA of a prescribed level is assigned in case of operating as FIG. 18.

FIG. 19 is a diagram for a situation that TA of a prescribed level is assigned in case of operating as FIG. 18.

As shown in FIG. 19, if an assigned TA is equal to or smaller than a value resulted from subtracting time necessary for switching from one OFDM symbol time, it may be able to use 12 symbols ranging from a symbol #0 to a symbol #11 in a subframe m. Hence, except a special case that a TA value is very big, it may be able to constantly maintain the number of symbols capable of being used for D2D and a plurality of UEs are able to share an identical format with each other. If TA is very big, it is necessary for an eNB to guarantee that a D2D subframe format using less symbols is to be used or transmission in a subframe m+1 is to be avoided.

Figure 20:
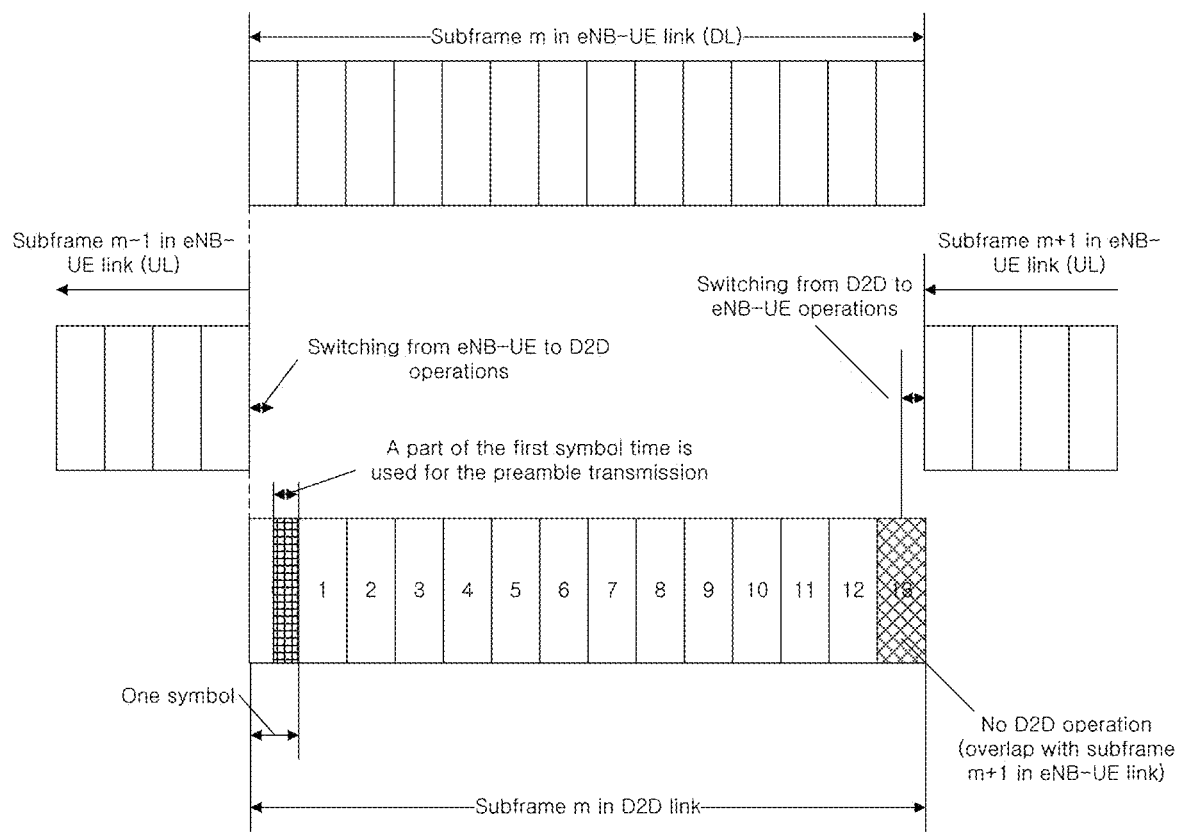
FIG. 20 is a diagram for a case that a subframe m assigned for D2D and a DL subframe have an identical subframe boundary and 0 is assigned for TA.

FIG. 20 is a diagram for a case that a subframe m assigned for D2D and a DL subframe have an identical subframe boundary and 0 is assigned for TA.

In this case, switching is performed for partial time of a symbol #0 of a subframe m and a preamble is transmitted using the remaining time. Consequently, an operation of transmitting a D2D signal including a preamble is performed at timing delayed as much as a prescribed offset from a boundary of a DL subframe. In this case, it is able to see that the number of symbols available for D2D and positions of the symbols are identical to the case of FIG. 18. In particular, a preamble is transmitted at timing delayed as much as an offset from the DL subframe boundary, a first regular D2D symbol is transmitted from timing identical to a second symbol of the DL subframe (a symbol #0 in FIG. 18 and a symbol #1 in FIG. 20), total 12 symbols are transmitted and received, and switching is performed for a transmission operation in a next subframe m+1. A difference between the two drawings is in that an index of a symbol used for D2D is different from each other. A structure of FIG. 20 is unable to use a first and a last symbol of a subframe m in delivering D2D information. As a result, the structure of FIG. 20 has a characteristic that a subframe structure is symmetrical. The structure of FIG. 20 has a merit in that a frequency domain is changed in a slot unit (i.e., the number of available symbols are identical to each other in two slots).

Figure 21:
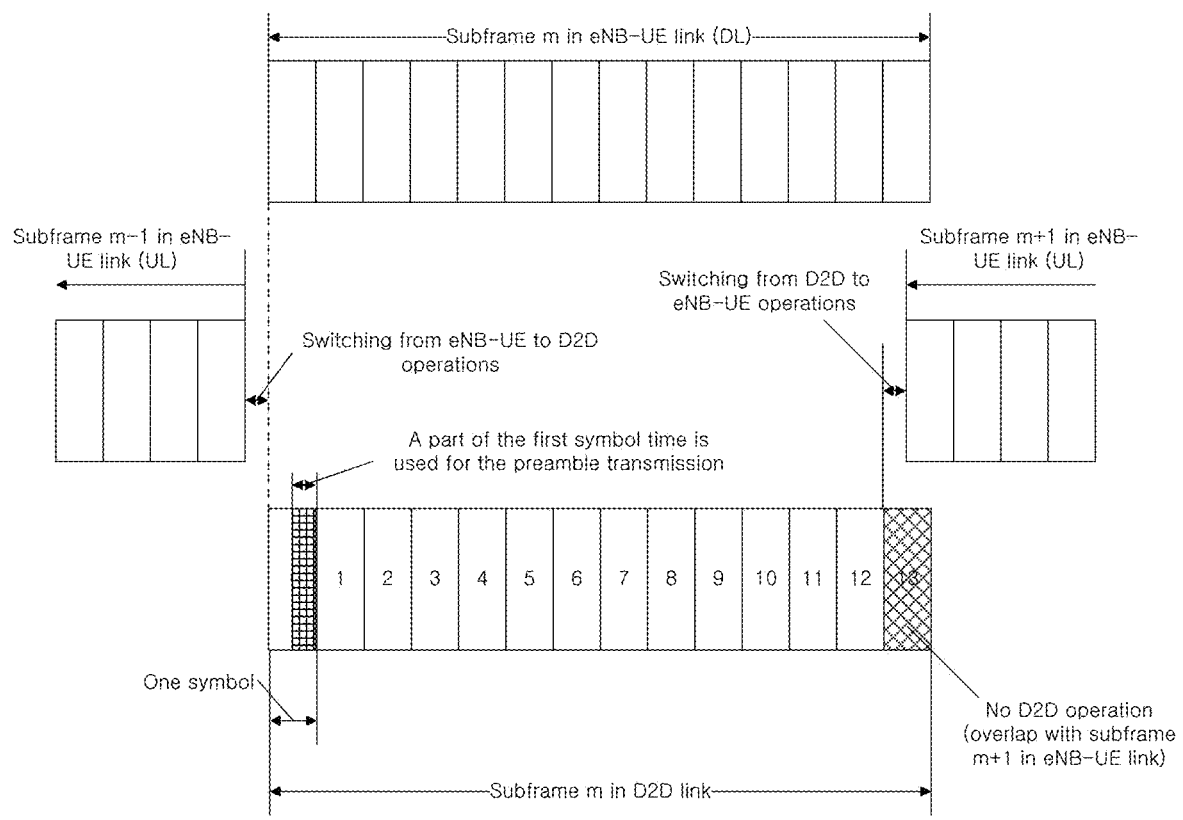
FIG. 21 is a diagram for a case that TA greater than 0 is assigned when a operation of FIG. 20 is performed.

FIG. 21 is a diagram for a case that TA greater than 0 is assigned when an operation of FIG. 20 is performed. As shown in FIG. 21, if the sum of a TA value and time necessary for performing switching is equal to or less than one OFDM symbol time, it may be able to use symbols ranging from a symbol #1 to a symbol #12.

In particular, an identical D2D subframe format can be shared by all UEs to which TA equal to or less than a prescribed level is applied. If the TA becomes greater than the level, it may be able to use a D2D subframe format using less symbols or it is necessary for an eNB to guarantee that transmission to the eNB is to be avoided in a subframe m+1.

Figure 22:
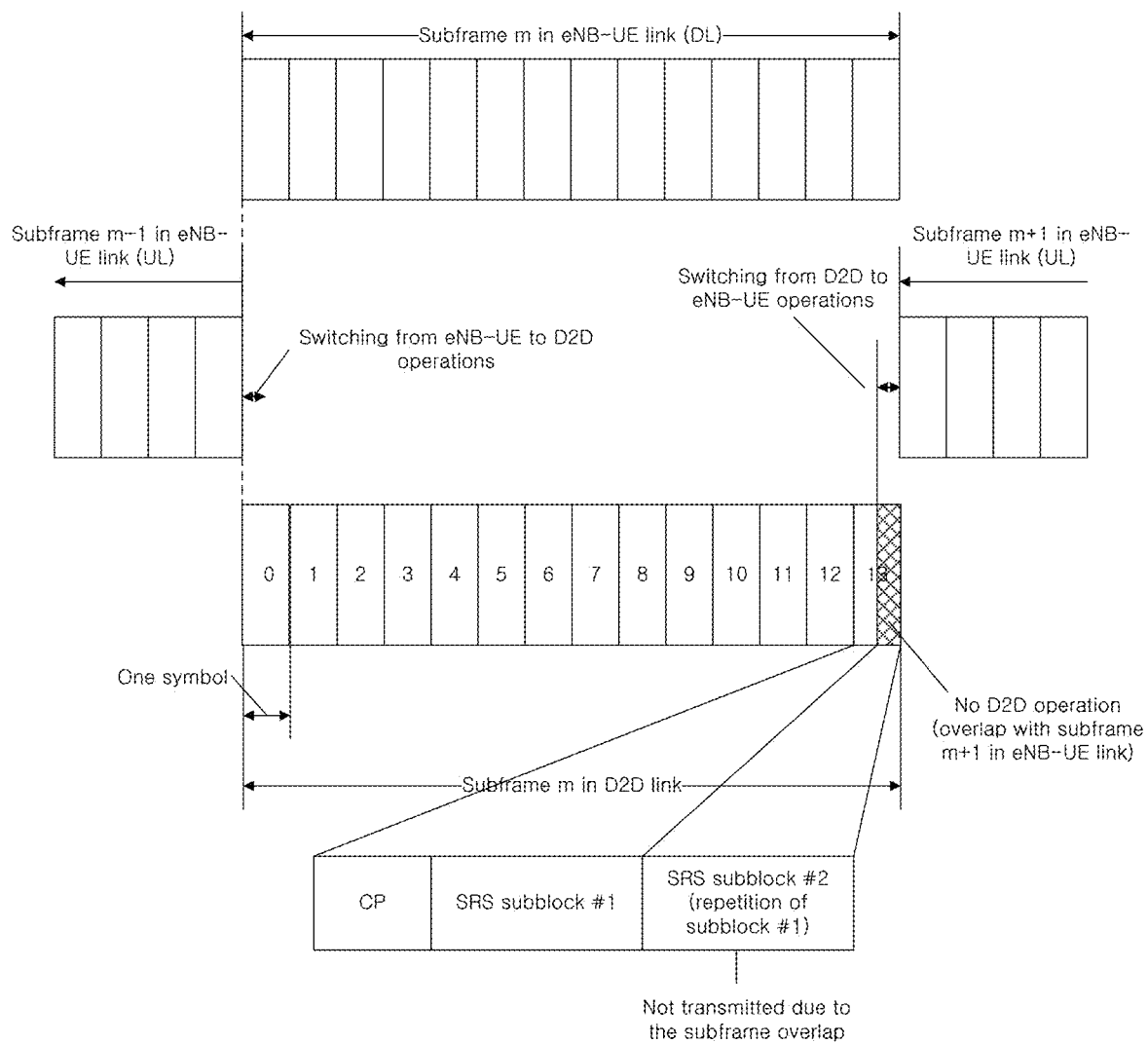
FIGS. 22 to 24 are diagrams for explaining a situation different from FIG. 20.

Meanwhile, in the aforementioned embodiments, when a subframe m is assigned for the usage of D2D, an operation of transmitting a D2D signal can be restricted in a partial time region of the subframe m to prevent an influence on a subframe m+1. The restriction operation can be performed in a unit smaller than a symbol unit. For example, referring to FIG. 22, it is able to transmit a D2D signal in a part of sample of a symbol #13. Yet, it is necessary to appropriately adjust a TA value to make transmission of a subframe m+1 start after time taken for switching between transmission and reception is elapsed from timing at which the D2D signal transmission part is terminated. To transmit a D2D signal using a partial sample only of a symbol can be referred to as partial symbol transmission. A sounding reference signal (SRS) of legacy LTE is appropriate for the partial symbol transmission. The SRS is configured to assign a signal once in two subcarriers and assign 0 in the remaining subcarriers. In terms of time dimension, the SRS transmission has a form that two identical signals are repeated (a cyclic prefix may exist before the two signals are repeated). Hence, the partial symbol transmission can be simply performed using a legacy signal transmission circuit in a manner of transmitting one of the signals of the time dimension which are repeated in a legacy SRS only. However, the principle of the partial symbol transmission is not restricted by a case of performing transmission using an SRS. The principle can also be applied to transmission of a reference signal or a signal corresponding to a codeword. In this case, a part of a sample corresponding to one symbol of the signal is transmitted only and time corresponding to the remaining sample can be used for the usage of performing switching between transmission and reception and the usage of absorbing TA of a next subframe.

When the aforementioned embodiments are used, if any subframe operates for D2D, a restriction occurs on an eNB-UE operation of an adjacent subframe. The restriction occurs because a boundary of a D2D subframe is not matched with a boundary of an eNB-UE subframe. Hence, when D2D operates in a series of subframes, it is necessary to continuously configure D2D subframes operating based on an identical subframe boundary to reduce the restriction.

Figure 23:
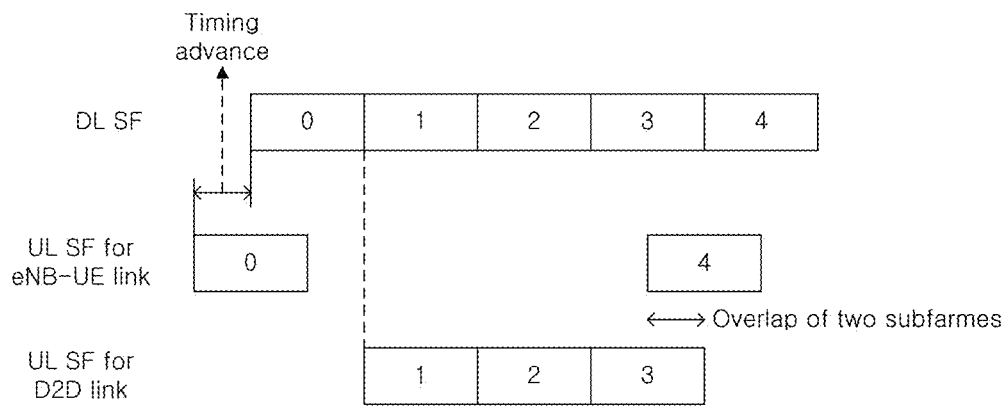

FIG. 23 shows an example of continuously configuring D2D subframes. When subframes 1, 2 and 3 are continuously used for D2D, the subframe 1 and the subframe 2 are able to use the whole area for D2D with no problem. In this case, various methods for solving an overlap problem with the eNB-UE link can be restrictively applied to such a last subframe as the subframe 3 only among a series of continuous D2D subframes.

In a FDD system, an operation of configuring continuous subframes as a D2D subframe can be implemented in a form of setting UL/DL configuration for TDD to a UL band. As an example, an eNB sets a configuration shown in Table 1 in the following or a new configuration to a FDD UL band, performs a D2D operation using a subframe boundary identical to a DL subframe (or a subframe boundary modified by a prescribed offset) of an eNB-UE link on a DL band in a subframe configured as DL, and performs a D2D operation using a subframe boundary identical to a UL subframe of a general eNB-UE link in a subframe configured as UL.

TABLE 1

| Uplink-downlink configuration | Downlink-to-Uplink Switch-point periodicity | Subframe number | | | | | | | |
|---|---|---|---|---|---|---|---|---|---|
| | | 0 | 1 | 2 | 3 | 4 | 5 | 6 | 7 |
| 0 | 4 ms | D | S | U | U | D | S | U | U |
| 1 | 4 ms | D | S | U | U | D | S | U | D |
| 2 | 4 ms | D | S | U | D | D | S | U | D |
| 3 | 8 ms | D | S | U | U | U | U | U | U |
| 4 | 8 ms | D | S | U | U | U | U | U | D |
| 5 | 8 ms | D | S | U | U | U | U | D | D |
| 6 | 8 ms | D | S | U | U | U | D | D | D |
| 7 | 8 ms | D | S | U | U | D | D | D | D |
| 8 | 8 ms | D | S | U | D | D | D | D | D |
| 9 | 8 ms | U | S | U | U | U | U | U | U |

In this case, the D2D operation performed in the subframe configured as DL can include both discovery and communication or can include either discovery or communication only. Or, the D2D operation, which is operating on the basis of a boundary of the DL subframe without TA, can be performed in the subframe configured as DL, whereas the D2D operation, which is operating on the basis of a boundary of the UL subframe which is configured according to TA assigned to a UE, can be performed in the subframe configured as UL. As an example, D2D discovery is performed without using a TA value optimized for an individual UE in the subframe configured as DL. On the contrary, D2D communication (i.e., D2D communication between UEs connected to an eNB) can be configured to use a subframe boundary, which is determined according to TA transmitted to an individual UE, in the subframe configured as UL.

According to an example of FIG. 23, it is able to consider as a subframe 1 and a subframe 2 are configured as DL and a subframe 0 is configured as UL. Subframes such as a subframe 3 and a subframe 4 at which overlap occurs can be interpreted as follows.

If the method 1 mentioned earlier in FIG. 6 is used, the subframe 3 is regarded as a special subframe and a region A capable of operating for D2D can be regarded as a DwPTS, and the remaining time can be regarded as a guard period absorbing TA. A region B is utilized as an eNB-UE link by the subframe 4 corresponding to a UL subframe.

If the method 2 mentioned earlier in FIG. 7 is used, since the whole area of the subframe 3 is able to operate for D2D, the subframe 3 is also regarded as a DL subframe. In this case, the subframe 4 is regarded as a special subframe. Since there is no D2D operation, a DwPTS does not exist. Hence, the subframe 4 can be regarded as a special subframe including a guard period and an UpPTS.

If the method 3 mentioned earlier in FIG. 8 is used, both the subframe 3 and the subframe 4 are regarded as a special subframe. Yet, it is able to consider that the subframe 3 does not include an UpPTS and the subframe 4 does not include a DwPTS. As a different meaning, a super subframe of which two subframes are connected with each other can be comprehended as a special subframe.

If the method 4 mentioned earlier in FIG. 9 is used, the subframe 3 is regarded as a special subframe and a partial area of a region A capable of operating for D2D is regarded as a DwPTS. The remaining time of the subframe 3 can be regarded as a guard period that absorbs TA. A region B is utilized as an eNB-UE link by the subframe 4 corresponding to a UL subframe. In some cases, an area belonging to the region A and the area in which D2D does not operate can be utilized as an UpPTS corresponding to an uplink transmission section toward an eNB. As an example, it may be able to transmit a PRACH preamble using less number of symbols or an SRS in the area. In particular, in case of applying the D2D subframe format 2 mentioned earlier in FIG. 12, a part of the last symbol of the region A can be configured as an UpPTS to transmit various uplink signals.

As mentioned in the foregoing description, an operation of setting a TDD UL/DL configuration to a UL band of FDD can be selectively set to a time section in which D2D operates only. As an example, the UL/DL configuration is applied to a radio frame appearing with a constant period only and the entire subframe can be regarded as a UL subframe in the remaining radio frame.

Specifically, since HARQ has an attribute of operating with a period of 8 ms in UL of FDD (i.e., retransmission is performed in a subframe n+8 in response to PUSCH transmitted in a subframe n), the present invention proposes that a TDD UL/DL configuration has a period of 4 ms, 8 ms, or a multiple of 8 ms. By doing so, a subframe belonging to a specific UL HARQ process only in an eNB-UE link can be utilized for the D2D operation. Hence, a restriction on a UL HARQ in the eNB-UE link can be limited to a specific process and the remaining process may operate with no influence. As an example, one of TDD UL/DL configurations shown in the following Table can be configured to a FDD UL band. In this case, it is assumed that the UL/DL configuration is repeated with a period of 4 ms or 8 ms shown in Table 1. If the TDD UL/DL configuration appears with a multiple of 8 ms, entire subframes are divided into groups of continuous 8 subframes and one of the configurations shown in Table 1 can be set to a part of the groups only. In Table 1, subframe number can be interpreted as a value corresponding to a remainder resulted from dividing (radio frame number*10+subframe number) by 8. Specifically, a configuration #9 of Table 1 has 1 special subframe and 7 UL subframes. In this case, a DwPTS of the special subframe is utilized for D2D according to the aforementioned methods and all of the remaining subframes can be utilized as a general UL subframe. In this case, the special subframe may exist at a random position and the position of the special subframe may not be restricted by the position shown in Table 1.

As a method of more simply implementing an operation similar to FIG. 23, M number of continuous UL subframes are separated from an eNB-UE link and D2D is actually performed in M−1 number of subframes only.

Figure 24:
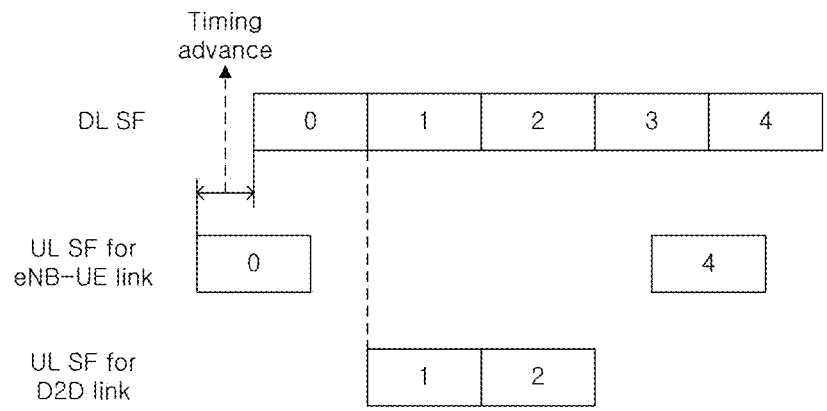

FIG. 24 shows an example of the method. Although subframes 1, 2 and 3 are separated from an eNB-UE link, the subframes 1 and 2 are practically used for D2D. In this case, it is able to consider that the subframe 3 is used for the usage of absorbing TA of each UE. Although the present method has a demerit in that it is unable to use one subframe, the method has a merit in that it is able to simplify a relevant operation without implementing various transmission and reception schemes according to TA. In particular, the present method is appropriate for a case that a D2D operation is intermittently performed.

When an additional UL/DL configuration is set to a UL band according to the above-mentioned method to notify a subframe in which a D2D operation is performed, if a whole subframe is usable for D2D in a manner of being configured in DL of D2D, the subframe can be used for D2D communication requiring relatively many resources. On the contrary, if a subframe is positioned at the last of a series of D2D subframes and the subframe is used as a special subframe, the subframe can be configured to be utilized for the usage of D2D discovery requiring relatively small amount of resources.

If a specific time/frequency resource is configured for a D2D operation but the resource is not utilized for actual D2D transmission/reception, an eNB can transmit data to a UE via the resource. The above-mentioned operation is feasible because the UE configures a subframe boundary at timing identical to timing of a DL subframe of an eNB-UE link in the resource.

TDD Case

Figure 25:
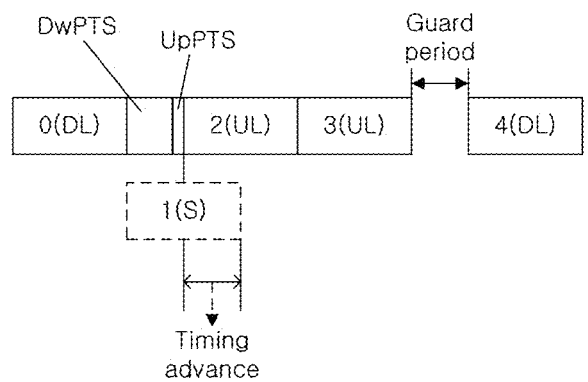
FIG. 25 is a diagram for DL and UL subframe boundaries in a general TDD situation.

FIG. 25 is a diagram for DL and UL subframe boundaries in a general TDD situation.

As shown in FIG. 25, a UL subframe starts prior to a DL subframe as much as a TA value and discordance between the subframes can be solved by controlling a guard period existing between a DwPTS and a UpPTS of a special subframe.

In case of TDD, D2D communication can be performed by applying the methods mentioned earlier in FDD. As a unique part of the TDD, the TDD has an attribute that it is preferable to configure a subframe in which D2D communication is performed by a UL subframe including no interference from eNB transmission and an attribute that the D2D communication has a subframe boundary identical to a DL subframe. In order to satisfy the two attributes, first of all, a D2D operation (or a part of the D2D operation such as discovery) uses a part configured as a UL subframe on a UL/DL configuration configured by an eNB (e.g., UL/DL configuration notified to a plurality of unspecified UEs via system information) and uses a subframe positioned at the last among continuous UL subframes. In this case, as shown in FIG. 26, a subframe boundary of the last subframe is configured to be identical to the subframe boundary of DL subframe.

Figure 26:
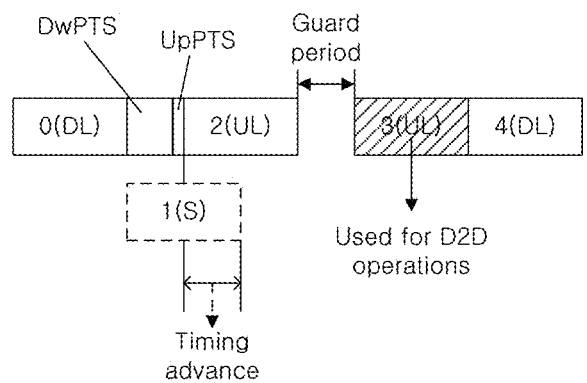
FIG. 26 is a diagram for a case that a subframe 3 is selected as D2D.

In FIG. 26, it is assumed that a subframe 3 is selected as a subframe used for D2D. In this case, continuous subframes can also be configured for subframes for D2D. As mentioned earlier in the embodiments of the FDD, a boundary adjusted from a boundary of a DL subframe as much as a prescribed offset can be configured as a boundary of the D2D subframe. In particular, if a structure shown in FIG. 26 is used, it is able to configure that a UL subframe assigned by an eNB-UE link does not exist after a random D2D subframe. Hence, it is able to prevent a subframe overlap problem, which occurs when a UL subframe of the eNB-UE link using TA appears after a D2D operation subframe not using TA, in advance. As a result, an eNB may use a configuration of using symbols as many as possible for a D2D operation irrespective of a TA value usable in a cell. As an example, it may be able to configure to always use the former one among the two D2D formats shown in FIG. 13 or it may be able to configure to utilize the partial symbol transmission mentioned earlier in FIG. 22. Or, as mentioned earlier in FIG. 14, if a TA equal to or greater than a prescribed level is assigned, it is able to freely perform eNB-UE link scheduling without a restriction that eNB-UE link transmission does not exist in a next subframe.

As mentioned earlier in the FDD, an operation similar to an operation of setting TDD UL/DL configuration to a UL band can be performed in TDD as well. An eNB informs a UE of a UL/DL configuration to indicate a usage of each subframe (i.e., whether a subframe is used for transmitting a signal of the eNB or a signal of the UE) and informs the UE of an additional UL/DL configuration to indicate that a place configured as a DL subframe corresponds to a place at which D2D is operable while a subframe identical to a DL subframe of the eNB-UE link is using. In order to guarantee that a UL subframe on the additional UL/DL configuration and a UL subframe of the eNB-UE link have an identical boundary, there may exist a restriction that it should be UL on the configuration indicating the usage of the subframe. Preferably, a D2D operation (or a part of the D2D operation such as discovery) is configured as DL on the additional configuration to use a DL subframe boundary of the eNB-UE link and the D2D operation is configured as UL on the configuration configured to designate the usage of each subframe to guarantee that there is no eNB signal transmission (at least CRS or CSI-RS transmission transmitted over all bands).

If a D2D discovery is transmitted from a UE located at the outside of eNB coverage, a subframe transmitted to the eNB with TA does not exist. Hence, if a D2D operation is performed in a manner of being similar to the case mentioned earlier in FIG. 26, a subframe overlap problem, which occurs due to TA applied to eNB-UE link transmission, does not occur. As a result, it may use a configuration of using symbols as many as possible for a D2D operation. As an example, it may be able to configure to always use the former one among the two D2D formats shown in FIG. 13 or it may be able to configure to utilize the partial symbol transmission mentioned earlier in FIG. 21.

As mentioned in the foregoing description, it may be able to use various frame types for D2D communication and UL/DL signals of various types are required for the D2D communication. A method of processing a signal when a plurality of signals are received or transmitted in a specific time interval in a wireless communication system supporting D2D communication is explained in the following based on the aforementioned contents.

<Method of Processing Plurality of Signals in Consideration of Reception Complexity>

If a plurality of signals (e.g., two signals) received from transmission UEs different from each other have a different TA (timing advance) or a different CP length, a receiving end is unable to demodulate the two signals by a single FFT processing. Hence, the receiving end should perform a plurality of FFT processing using a different window, thereby increasing complexity. Due to the characteristic of D2D transmission, a plurality of TX UEs may attempt to perform transmission to a single RX UE and signals transmitted by a plurality of the TX UEs may have a different TA or a different CP. In order to reduce implementation complexity in the situation, it may be necessary to have an appropriate rule.

Hence, one embodiment of the present invention proposes a method of selecting and processing a specific signal according to priority when it is necessary to transmit or receive a plurality of signals in an identical time section (e.g., a subframe).

As an example of a plurality of signals capable of being transmitted in an identical time section, Table 2 in the following shows a plurality of D2D signals and WAN signals. "1" and "2" attached to the back of a signal name is used as a delimiter for distinguishing a signal 1 from a signal 2.

TABLE 2

D2D discovery Rx1, Rx2
D2D communication Rx1, Rx2
D2D scheduling assignment Rx1, Rx2
D2D synchronization signal Rx1, Rx2
D2D synchronization channel Rx1, Rx2
D2D discovery Rx, WAN DL Rx
D2D communication Rx, WAN DL Rx
D2D scheduling assignment Rx, WAN DL Rx
D2D synchronization signal Rx, WAN DL Rx
D2D synchronization channel Rx, WAN DL Rx In this case, "D2D communication Rx1, Rx2" corresponds to a general D2D signal (e.g., a data signal) except a discovery signal, a synchronization signal, a resource allocation (SA) signal among D2D signals.

As shown in Table 2, when a plurality of reception signals are processed in an identical time section, a preferred embodiment of the present invention proposes to preferentially process a signal received from a UE of which a TA (timing advance) value is small among a plurality of the signals. According to a different embodiment of the present invention proposes to preferentially process a synchronization signal (sidelink synchronization signal) among a plurality of the signals. In this case, although a TA value of the synchronization signal is smaller than that of a different signal, the synchronization signal may have priority.

A scheme of processing a plurality of signals according to priority is shown in Table 3 in the following. In Table 3, various reception signals are listed in a first column and a first row. Table 3 shows a processing scheme according to priority at an intersection of each row and each column when signals corresponding to the intersection are received at identical timing.

TABLE 3

| Different TA (TA1 < TA2) | Discovery 2 | Scheduling assignment 2 | Synchronization signal 2 | Synchronization channel 2 | Commun. 2 | WAN DL Rx 2 |
|---|---|---|---|---|---|---|
| Discovery 1 | Discovery 1 of small TA | Select discovery 1 of small TA | Select reception signal of small TA, or select synchronization signal 2 although TA is big (configuration) | Select reception signal of small TA | Select reception signal of small TA | Select reception signal of small TA |

TABLE 3-continued

| Different TA (TA1 < TA2) | Discovery 2 | Scheduling assignment 2 | Synchronization signal 2 | Synchronization channel 2 | Commun. 2 | WAN DL Rx 2 |
|---|---|---|---|---|---|---|
| Scheduling assignment 1 | Configure not to be overlapped in identical SF. If overlapped, select SA1 of small TA | Assign SF different from each other. If same SF, select SA1 of small TA | Select SA1 of small TA | Select reception signal of small TA | Select reception signal of small TA | Select reception signal of small TA |
| Synch. signal 1 | Assign to SFs different from each other. If same SF, select Synch signal 1 of small TA | Allocate resource to SF different from each other. If allocated to same SF, select and receive synch. signal of small TA | Select Synch.signal 1 of small TA | Select reception signal of small TA | Select reception signal of small TA | Select reception signal of small TA |
| Synch. channel 1 | Assign to SFs different from each other. If same SF, select Synch channel of small TA | Allocate resource to SF different from each other. If allocated to same SF, select and receive synch. channel of small TA | Select synch.channel 1 of small TA | Select reception signal of small TA | Select reception signal of small TA | Select reception signal of small TA |
| Comm. 1 | Allocate to SF different from each other. If same SF, select Comm. 1 of small TA | Allocate resource to SF different from each other. If allocated to same SF, select and receive comm. 1 of small TA | Select comm. 1 of small TA | Select reception signal of small TA | Select reception signal of small TA | Select reception signal of small TA |
| WAN DL Rx1 | Allocate to SF resources different from each other. If overlapped, select WAN DL of small TA. | Allocate resource to SF different from each other (TDM). If allocated to same SF, receive and protect WAN of small TA. | Select WAN DL Rx1 of small TA | Select reception signal of small TA | Select reception signal of small TA | Select reception signal of small TA |

TA values are compared with each other between signals different from each other and a value of small TA is selected only (when TA of bigger value does not exceed threshold).
If TA of bigger value exceeds threshold, signal is not received.

A different aspect of the present embodiment handles processing priority handling in case that a signal 1 uses a normal CP and a signal 2 uses an extended CP. According to one embodiment, it is able to make a signal including an extended CP to be selected as a general rule. Yet, a normal CP can be selected according to an attribute of a signal. In Table 3 and Table 4 in the following, if two priorities are described together, it indicates that configuration is made via an RRC signal or an SIB signal in advance. And, among the configuration signals mentioned in each cell of each table, a firstly mentioned signal corresponds to a default signal.

TABLE 4

| | 2: extended CP | | | | | |
|---|---|---|---|---|---|---|
| 1: normal CP | Discovery 2 (DS2) | Scheduling assignment 2 (SA2) | Synchronization signal 2 (SYNC2) | Synchronization channel 2 (SYNC.CH2) | Commun. 2 (COM2) | WAN DL RX 2 (WAN2) |
| Discovery 1 (DS1) | Extended CP signal (DS2) | Configuration between SA2 or DS1 | SYNC2 | SYNC.CH2 | Configuration between COM2 and DS1 | WAN RX2 |
| Scheduling assignment 1 (SA1) | Configuration between SA1 and DS2 | Extended CP signal (SA2) | Configuration SYNC2 and SA1 | Configuration SYNC.CH2 and SA1 | Configuration between COM2 and SA1 | WAN RX2 |
| Synch. signal 1 (SYNC1) | Configuration between SYNC 1 and DS2 | Configuration between SA2 and SYNC1 | Extended CP signal(SYNC2) | SYNC.CH2 | Configuration between COM2 and SYNC1 | Configuration between SYNC2 and WAN RX2 |

TABLE 4-continued

| | | | 2: extended CP | | | |
|---|---|---|---|---|---|---|
| 1: normal CP | Discovery 2 (DS2) | Scheduling assignment 2 (SA2) | Synchronization signal 2 (SYNC2) | Synchronization channel 2 (SYNC.CH2) | Commun. 2 (COM2) | WAN DL RX 2 (WAN2) |
| Synch. channel 1 (SYNC.CH1) | SYNC.CH 1 | Configuration between SA2 and SYCN.CH1 | SYNC2 | Extended CP signal (SYNC.CH2) | Configuration between COM2 and SYNC.CH1 | Configuration SYNC.CH1 and WAN RX2 |
| Comm. 1 (COM1) | Comm. 1 | Configuration between SA2 and COM1 | SYNC2 | SYNC.CH2 | Extended CP signal (COM2) | WAN RX2 |
| WAN DL RX1 (WAN1) | WAN RX1 | WAN RX1 | SYNC2 | SYNC.CH2 | WAN RX1 | NA |

According to the aforementioned embodiments, if timing has a difference equal to or greater than a prescribed level, one signal is selected in terms of the increase of complexity since it is necessary to perform FFT several times. And, a case that TA exceeds a predetermined threshold TA is considered as well. Although an attribute of a signal has very high priority, if the signal is received in a manner of being deviated from a TA value, it may consider a method of not selecting the signal as well.

<Method of Selecting Transmission Signal when Transmission Occasion is Collided>

When one TX UE transmits different D2D data to multiple RX UEs or groups using a different RPT (resource pattern of transmission), it is necessary to clearly define an operation of the TX UE at the time that resource patterns are collided with each other. As a simple method, the TX UE may be able to select and transmit one of the different D2D data only. In this case, it is necessary to define data to be selected in advance.

The RPT corresponds to resources selected from a resource pool configured by SIB and the resources bound by one (in time domain). The resources bound by one may be referred to as a resource pattern. One configured resource set may include a plurality of resource patterns. The resource set and the patterns can be differently configured and selected depending on a relationship between a TX UE and an RX UE. Under this assumption, although a set used by the TX UE for an RX UE group 1 is different from a set used by the RPT for an RX UE group 2, two RPTs may indicate an identical subframe or an RB at a specific timing (e.g., subframe) in some cases. Of course, it may be able to determine a rule that data is transmitted to the RPT all the time. Yet, since it is also able to determine a rule for an opposite case, it may be able to consider various operations in terms of the TX UE.

First of all, if resources indicated by the RPT are overlapped with each other and it is necessary to transmit D2D data to the resources, since it is unable to transmit multiple data at the same time, it is preferable to select one D2D data. It may be able to determine priority in advance in consideration of an attribute of D2D data. For example, if dynamic scheduled data and semi-static scheduled data exist at the same time, it may be able to configure to select and transmit one of the data in advance. Or, it may be able to fix one of the data to be transmitted as a rule. For example, the dynamic data can be preferentially transmitted with higher priority.

It is able to precisely perform demodulation only when the RX UE is aware of the aforementioned configuration. Hence, it is necessary to deliver appropriate information to the RX UE or it is necessary to make the RX UE perform blind search after the RX UE recognizes the configuration.

The aforementioned situation corresponds to an example of a situation that 2 RPTs are collided with each other. Possibility of collision of two or more RPTs exists as well. In this case, a priority rule can be configured in various ways. First of all, it may be able to place priority on an RPT at which transmission starts first. For example, if data attempted to be transmitted K1 times and data attempted to be transmitted K2 times are collided with each other in an identical resource in an RPT including N number of transmission occasions, it may be able to select and transmit the data attempted to be transmitted K1 times (K1>K2). To this end, it is necessary to define an RPT that enables the RX UE to identify and compare a start position of an RPT pattern and an order of transmission.

If an RPT of an RX UE1 and an RPT of an RX UE2 are identical to each other in terms of a start subframe and a period, it is able to check an order of transmission opportunity in the RPT. Hence, it is able to select data to be transmitted by comparing frequency of transmission with each other. Yet, according to the present scheme, since the RX UEs are unable to know the data to be transmitted, the RX UEs perform blind decoding and checks data of the RX UEs via CRC check or the like.

If a receiving end performs blind searching, a transmitting end can randomly select data and transmit the data without a separate rule.

If separate priority is given to an RPT index, an RPT index of a smaller value may have higher TX priority. For example, when a TX UE performs transmission using RPT 0, RPT 3, and RPT 7, if resource collision occurs between the RPTs, the TX UE selects an RPT index of a smaller value to perform transmission. Of course, this is because such a rule that a smaller index has higher TX priority has been determined in advance. If a different set and a different RPT are configured, TX priority can be given to the set as well. In this case, it is necessary to perform TX selection in consideration of not only an RPT index but also a set index. If a reception UE knows the above-mentioned situation, it would be helpful. But, it is able to solve the problem by performing a blind decoding method in consideration of signaling burden.

When the aforementioned operation is performed, data heading toward a specific RX UE may be dropped or delayed. In case of delayed transmission, transmission parameters of a subframe in which transmission has failed can be used in a following TX opportunity subframe as it is. In this case, it is able to apply an identical transmission-related parameter setting except time delay. For example, if RV is used as one of the transmission parameters, in case of the delayed transmission, transmission is performed using an RV value identical to a value used in the subframe in which transmission has failed. On the contrary, in case of dropped transmission, since transmission itself is dropped in a subframe, transmission is performed in a following TX opportunity subframe using a different RV (redundancy version) by newly calculating a transmission parameter.

Meanwhile, as mentioned in the foregoing description, TX priority can be determined according to an attribute of a signal. In case of an emergency signal, TX priority can be configured to be higher than that of a different signal.

Unlikely, it may be able to configure data transmitted to a semi-statically allocated resource to have higher priority (when RPT resource collision occurs). In this case, when it is assumed as a resource is reserved and used to allocate an exclusive resource for an important signal, if collision with a different transmission data occurs, it may be preferable to drop or delay a different transmission data signal.

In a broad sense, there is a set or an RPT used under an assumption of exclusive resource allocation and a set or an RPT used with possibility of overlap/collision. In this case, a set or an RPT can be differently allocated according to an attribute of a UE, a data attribute, or a characteristic of a signal. A best effort service or a delay insensitive data, which is insensitive to delay or drop of data, is used while enduring overlap/collision of a partial subframe (or RB) in an RPT pattern. In case of a delay sensitive data or a high-quality guaranteed service, an RPT or a set including a non-overlapped resource pattern is allocated.

Figure 27:
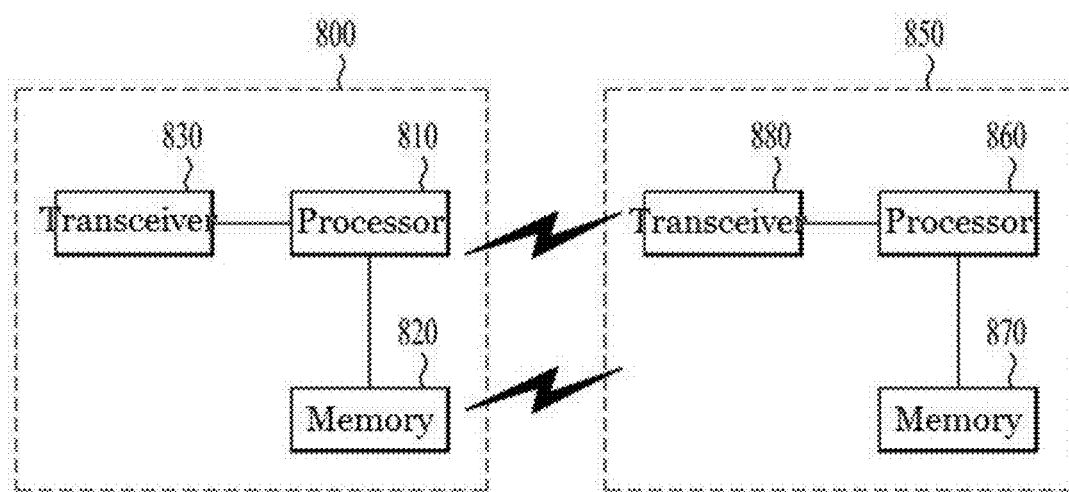
FIG. 27 is a diagram for explaining a device configured to perform the aforementioned operation.

FIG. 27 is a diagram for explaining a device configured to perform the aforementioned operation.

A wireless device 800 in FIG. 27 may correspond to a specific UE 1 of the aforementioned description and a wireless device 850 may correspond to a different specific UE 2 of the aforementioned description. If a UE 1 communicates with an eNB, it can be regarded as a UE 1 and an eNB.

A UE 1 can include a processor 810, a memory 820, and a transceiver 830. A UE 2 850 can include a processor 860, a memory 870, and a transceiver 880. The transceiver 830/880 is configured to transmit/receive a radio signal and can be executed in a physical layer. The processor 810/860 is executed in a physical layer and/or an MAC layer and is connected with the transceiver 830/880. The processor 810/860 can perform the aforementioned interference control procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be applied to various wireless systems supporting direct communication between wireless devices.

What is claimed is:

1. A method of transmitting and receiving a signal in a wireless communication system supporting D2D (device-to-device) communication, the method performed by a user equipment (UE) and comprising:
   receiving an RRC (radio resource control) signal related to the D2D communication from an eNB;
   transceiving a discovery signal with at least one other UE;
   transceiving a D2D synchronization signal for the D2D communication with the at least one other UE;
   transceiving a resource allocation signal with the at least one other UE; and
   transceiving a D2D communication signal with the at least one other UE based on the transceived resource allocation signal,
   wherein transmission of the D2D synchronization signal is prioritized over transmission of the discovery signal when the D2D synchronization signal and the discovery signal are scheduled for transmission in a same time unit such that the discovery signal is not transmitted in the same time unit, and
   wherein a first discovery signal from a UE of a smaller TA (timing advanced) is prioritized over a second discovery signal from a UE of a larger TA when the discovery signal from the UE of the smaller TA and the discovery signal from the UE of the larger TA are received in the same time unit.

2. The method of claim 1, wherein a signal using an extended CP (cyclic prefix) is prioritized over a signal using a normal CP when the signal using the normal CP and the signal using the extended CP are received in the same time unit.

3. A user equipment (UE) transmitting and receiving a signal in a wireless communication system supporting D2D (device-to-device) communication, the UE comprising:
   a transceiver configured to receive and transmit signals; and
   a processor connected with the transceiver and configured to control the transceiver to:
   receive an RRC (radio resource control) signal related to the D2D communication from an eNB;
   transceive a discovery signal with at least one other UE;
   transceive a D2D synchronization signal for the D2D communication with the at least one other UE;
   transceive a resource allocation signal with the at least one other UE; and
   transceive a D2D communication signal with the at least one other UE based on the transceived resource allocation signal,
   wherein transmission of the D2D synchronization signal is prioritized over transmission of the discovery signal when the D2D synchronization signal and the discovery signal are scheduled for transmission in a same time unit such that the discovery signal is not transmitted in the same time unit, and wherein a first discovery signal from a UE of a smaller TA (timing advanced) is prioritized over a second discovery signal from a UE of a larger TA when the discovery signal from the UE of the smaller TA and the discovery signal from the UE of the larger TA are received in the same time unit.

4. The UE of claim 3, wherein a signal using an extended CP (cyclic prefix) is prioritized over a signal using a normal CP when the signal using the normal CP and the signal using the extended CP are received in the same time unit.

* * * * *